United States Patent
Li et al.

(10) Patent No.: US 11,622,347 B2
(45) Date of Patent: Apr. 4, 2023

(54) SEMI-PERSISTENT SCHEDULING FOR SUBBAND FULL-DUPLEX SLOTS

(71) Applicant: QUALCOMM Incorporated, San Diego, CA (US)

(72) Inventors: Chih-Ping Li, San Diego, CA (US); Seyedkianoush Hosseini, San Diego, CA (US); Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 17/329,073

(22) Filed: May 24, 2021

(65) Prior Publication Data

US 2021/0377926 A1    Dec. 2, 2021

Related U.S. Application Data

(60) Provisional application No. 63/033,067, filed on Jun. 1, 2020.

(51) Int. Cl.
*H04W 72/04* (2023.01)
*H04L 5/14* (2006.01)
*H04W 72/044* (2023.01)

(52) U.S. Cl.
CPC ............ *H04W 72/044* (2013.01); *H04L 5/14* (2013.01)

(58) Field of Classification Search
CPC ........... H04W 72/0446; H04W 72/044; H04W 72/042; H04L 5/0007; H04L 5/14; H04L 5/0053; H04L 5/0094; H04L 5/001
See application file for complete search history.

(56) References Cited

U.S. PATENT DOCUMENTS

2016/0205683 A1* 7/2016 Quan .................... H04W 16/10
                                                             370/280
2017/0163404 A1* 6/2017 Liu .................... H04W 72/0413
(Continued)

FOREIGN PATENT DOCUMENTS

EP          3444987 A1     2/2019

OTHER PUBLICATIONS

International Search Report and Written Opinion—PCT/US2021/034066—ISA/EPO—dated Oct. 26, 2021.
(Continued)

*Primary Examiner* — Maharishi V Khirodhar
*Assistant Examiner* — Kenneth P Hunt
(74) *Attorney, Agent, or Firm* — Holland & Hart LLP/Qualcomm Incorporated

(57) ABSTRACT

Methods, systems, and devices for wireless communications are described. Generally, the described techniques provide for identification of a slot format for a set of slots where at least one slot format of the set is an subband full-duplex slot (e.g., includes uplink and downlink resources separated in a frequency domain). The base station may transmit one or more semi-persistent scheduling configurations to a UE. The UE may identify semi-persistent scheduling occasions for receiving a downlink communication based at least in part on the SPS configurations matching the format of the slot, the periodicity of the slot formats of the set, or other considerations. The UE and the base station may communicate based at least in part on the determined semi-persistent scheduling occasions.

30 Claims, 19 Drawing Sheets

(56) References Cited

U.S. PATENT DOCUMENTS

| | | | | |
|---|---|---|---|---|
| 2019/0320437 A1* | 10/2019 | Gupta | ............... | H04W 72/0406 |
| 2020/0145175 A1* | 5/2020 | Hassan Hussein | . | H04W 72/082 |
| 2020/0228196 A1* | 7/2020 | John Wilson | ..... | H04W 72/0446 |
| 2020/0236661 A1* | 7/2020 | Hassan Hussein | . | H04W 72/042 |
| 2020/0382267 A1* | 12/2020 | Soriaga | ................... | H04L 5/001 |

OTHER PUBLICATIONS

ZTE: "Enhancements for DL SPS Configurations", 3GPP Draft, 3GPP TSG RAN WG1 #97, R1-1906416, Enhancements for DL SPS Configurations, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727866, 5 Pages, Retrieved from the Internet: URL: http://www.3gpp.org/ftp/Meetings%5F3GPP%5FSYNC/RAN1/Docs/R1%2D1906416%2Ezip, [retrieved on May 13, 2019], Section 2.3, The whole document.

\* cited by examiner

SEMI-PERSISTENT SCHEDULING FOR SUBBAND FULL-DUPLEX SLOTS

CROSS REFERENCE

The present application for patent claims the benefit of U.S. Provisional Patent Application No. 63/033,067 by LI et al., entitled "SEMI-PERSISTENT SCHEDULING FOR SUBBAND FULL-DUPLEX SLOTS," filed Jun. 1, 2020, assigned to the assignee hereof, and expressly incorporated by reference herein.

FIELD OF TECHNOLOGY

The following relates generally to wireless communications and more specifically to semi-persistent scheduling for subband full-duplex slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless radio access technologies (RATs) may support communication via various modes. For example, a base station may configure communications in a slot for one of uplink or downlink communications, which may be referred to a half-duplex mode. However, a device may be able to perform both uplink and downlink communications within the same slot. Performing uplink and downlink communications within the same slot may be referred to as full-duplex. As such, resources may be allocated for UE by the base station depending on the capability of the UE to perform half or full-duplex communications as well as in order to avoid interference between multiple transmissions.

SUMMARY

The described techniques relate to improved methods, systems, devices, and apparatuses that support semi-persistent scheduling for subband full-duplex slots. Generally, the described techniques provide for identification of a slot format for a set of slots where at least one slot format of the set is an subband full-duplex slot (e.g., includes uplink and downlink resources separated in a frequency domain). The base station may transmit one or more semi-persistent scheduling configurations to a UE. The UE may identify semi-persistent scheduling occasions for receiving a downlink communication based at least in part on the SPS configurations matching the format of the slot, the periodicity of the slot formats of the set, or other considerations. The UE and the base station may communicate based at least in part on the determined semi-persistent scheduling occasions.

A method of wireless communications at a UE is described. The method may include identifying a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, receiving, from a base station, a set of semi-persistent scheduling configurations for receiving downlink transmissions from the base station, where each of the set of semi-persistent scheduling configurations is configured for one or more of the first set of slots and for corresponding slots of the subsequent pluralities of slots based on the slot format of each of the first set of slots, and communicating with the base station based on the set of semi-persistent scheduling configurations.

An apparatus for wireless communications at a UE is described. The apparatus may include a processor, memory coupled with the processor, and instructions stored in the memory. The instructions may be executable by the processor to cause the apparatus to identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, receive, from a base station, a set of semi-persistent scheduling configurations for receiving downlink transmissions from the base station, where each of the set of semi-persistent scheduling configurations is configured for one or more of the first set of slots and for corresponding slots of the subsequent pluralities of slots based on the slot format of each of the first set of slots, and communicate with the base station based on the set of semi-persistent scheduling configurations.

Another apparatus for wireless communications at a UE is described. The apparatus may include means for identifying a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, receiving, from a base station, a set of semi-persistent scheduling configurations for receiving downlink transmissions from the base station, where each of the set of semi-persistent scheduling configurations is configured for one or more of the first set of slots and for corresponding slots of the subsequent pluralities of slots based on the slot format of each of the first set of slots, and communicating with the base station based on the set of semi-persistent scheduling configurations.

A non-transitory computer-readable medium storing code for wireless communications at a UE is described. The code may include instructions executable by a processor to identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, receive, from a base station, a set of semi-persistent scheduling configurations for receiving downlink transmissions from the base station, where each of the set of semi-persistent scheduling configurations is configured for one or more of the first set of slots and for corresponding slots of the subsequent pluralities of slots based on the slot format of each of the first set of slots, and communicate with the base station based on the set of semi-persistent scheduling configurations.

In some examples of the method, apparatuses, and non-transitory computer-readable medium described herein, receiving the set of semi-persistent scheduling configurations may include operations, features, means, or instructions for receiving a periodicity value such that each of the set of semi-persistent scheduling configurations may be configured for the one or more of the first set of slots and for corresponding slots of the subsequent pluralities of slots based on the periodicity value.

In some examples of the method, apparatuses, and non-transitory computer-readable medium described herein, the periodicity value specifies a value n number of slots such that a particular semi-persistent scheduling configuration of the set of semi-persistent scheduling configurations may be configured for the nth slot in the first set of slots and the nth slot in the subsequent pluralities of slots.

In some examples of the method, apparatuses, and non-transitory computer-readable medium described herein, receiving the set of semi-persistent scheduling configurations may include operations, features, means, or instructions for receiving a first semi-persistent scheduling configuration of the set of semi-persistent scheduling configurations that may be configured for more than one slot of the first set of slots and for corresponding slots of the subsequent pluralities of slots, where the more than one slot each share a same slot format.

In some examples of the method, apparatuses, and non-transitory computer-readable medium described herein, communicating with the base station may include operations, features, means, or instructions for receiving the downlink transmissions from the base station in downlink resources of the first set of slots allocated based on the set of semi-persistent scheduling configurations.

In some examples of the method, apparatuses, and non-transitory computer-readable medium described herein, at least one downlink transmission may be received in at least a portion of the downlink resources of the at least one slot.

In some examples of the method, apparatuses, and non-transitory computer-readable medium described herein, receiving the set of semi-persistent scheduling configurations may include operations, features, means, or instructions for receiving a radio resource control signal indicating the set of semi-persistent scheduling configurations.

In some examples of the method, apparatuses, and non-transitory computer-readable medium described herein, each of the set of semi-persistent scheduling configurations indicates a timing offset corresponding to a first subframe of a respective slot, duration of time-domain resources of the respective slot, frequency domain resources of the respective slot, or a combination thereof.

A method of wireless communications at a UE is described. The method may include identifying a slot format for a slot of a set of slots, where the slot format for the slot specifies uplink resources and downlink resources separated in a frequency domain, receiving, from a base station, at least one semi-persistent scheduling configuration for receiving downlink transmissions from the base station, determining, for the slot of the set of slots, one or more semi-persistent scheduling occasions for receipt of at least one downlink shared channel transmission based on the slot format of the slot and the at least one semi-persistent scheduling configuration, and communicating with the base station based on determining the semi-persistent scheduling occasions for the slot.

An apparatus for wireless communications at a UE is described. The apparatus may include a processor, memory coupled with the processor, and instructions stored in the memory. The instructions may be executable by the processor to cause the apparatus to identify a slot format for a slot of a set of slots, where the slot format for the slot specifies uplink resources and downlink resources separated in a frequency domain, receive, from a base station, at least one semi-persistent scheduling configuration for receiving downlink transmissions from the base station, determine, for the slot of the set of slots, one or more semi-persistent scheduling occasions for receipt of at least one downlink shared channel transmission based on the slot format of the slot and the at least one semi-persistent scheduling configuration, and communicate with the base station based on determining the semi-persistent scheduling occasions for the slot.

Another apparatus for wireless communications at a UE is described. The apparatus may include means for identifying a slot format for a slot of a set of slots, where the slot format for the slot specifies uplink resources and downlink resources separated in a frequency domain, receiving, from a base station, at least one semi-persistent scheduling configuration for receiving downlink transmissions from the base station, determining, for the slot of the set of slots, one or more semi-persistent scheduling occasions for receipt of at least one downlink shared channel transmission based on the slot format of the slot and the at least one semi-persistent scheduling configuration, and communicating with the base station based on determining the semi-persistent scheduling occasions for the slot.

A non-transitory computer-readable medium storing code for wireless communications at a UE is described. The code may include instructions executable by a processor to identify a slot format for a slot of a set of slots, where the slot format for the slot specifies uplink resources and downlink resources separated in a frequency domain, receive, from a base station, at least one semi-persistent scheduling configuration for receiving downlink transmissions from the base station, determine, for the slot of the set of slots, one or more semi-persistent scheduling occasions for receipt of at least one downlink shared channel transmission based on the slot format of the slot and the at least one semi-persistent scheduling configuration, and communicate with the base station based on determining the semi-persistent scheduling occasions for the slot.

Some examples of the method, apparatuses, and non-transitory computer-readable medium described herein may further include operations, features, means, or instructions for selecting one or more of the at least one semi-persistent scheduling configuration for receiving the downlink transmissions for the slot based on a highest priority of the at least one semi-persistent scheduling configuration or a lowest index of the at least one semi-persistent scheduling configuration.

Some examples of the method, apparatuses, and non-transitory computer-readable medium described herein may further include operations, features, means, or instructions for determining that a semi-persistent scheduling occasion for receiving the downlink shared channel transmission allocated by the at least one semi-persistent scheduling configuration overlaps with the uplink resources for the slot or guard resources for the slot, and determining the downlink transmissions for the slot may be to be received in the resources of the semi-persistent scheduling occasion that may be not overlapping with the uplink resources for the slot or the guard resources for the slot.

Some examples of the method, apparatuses, and non-transitory computer-readable medium described herein may further include operations, features, means, or instructions for receiving, from the base station, a slot format indication that allocates at least a portion of the uplink resources for the slot.

In some examples of the method, apparatuses, and non-transitory computer-readable medium described herein, the at least one semi-persistent scheduling configuration may be not associated with a downlink bandwidth or a downlink bandwidth part index.

Some examples of the method, apparatuses, and non-transitory computer-readable medium described herein may further include operations, features, means, or instructions for determining that a set of semi-persistent scheduling configurations may be each configured for a respective slot format.

In some examples of the method, apparatuses, and non-transitory computer-readable medium described herein, determining the one or more semi-persistent scheduling occasions for receipt of the at least one downlink shared channel transmission may include operations, features, means, or instructions for determining that a subset of the set of semi-persistent scheduling configurations may be configured for respective slot formats that match the slot format of the slot.

Some examples of the method, apparatuses, and non-transitory computer-readable medium described herein may further include operations, features, means, or instructions for selecting one of the subset of semi-persistent scheduling configurations for receipt of the at least one downlink shared channel transmission during the slot based on a highest priority or a lowest index of the subset of semi-persistent scheduling configurations.

In some examples of the method, apparatuses, and non-transitory computer-readable medium described herein, determining the one or more semi-persistent scheduling occasions for receipt of the at least one downlink shared channel transmission may include operations, features, means, or instructions for determining that none of the set of semi-persistent scheduling configurations may be configured for respective slot formats that match the slot format of the slot.

Some examples of the method, apparatuses, and non-transitory computer-readable medium described herein may further include operations, features, means, or instructions for selecting one of the semi-persistent scheduling configurations for receipt of the at least one downlink shared channel transmission during the slot based on a highest priority or a lowest index of the semi-persistent scheduling configurations in accordance with determining that none of the set of semi-persistent scheduling configurations may be configured for respective slot formats that match the slot format of the slot.

Some examples of the method, apparatuses, and non-transitory computer-readable medium described herein may further include operations, features, means, or instructions for determining that the UE may be not to receive the downlink transmissions in the first slot based on determining that none of the set of semi-persistent scheduling configurations may be configured for respective slot formats that match the slot format of the slot.

Some examples of the method, apparatuses, and non-transitory computer-readable medium described herein may further include operations, features, means, or instructions for identifying that each of the at least one semi-persistent scheduling configuration includes an indication of a downlink bandwidth, a downlink bandwidth part index, or both, where determining the semi-persistent scheduling configuration that may be configured for each slot may be further based on each of the at least one semi-persistent scheduling configuration including the indication of the downlink bandwidth, the downlink bandwidth part index, or both.

Some examples of the method, apparatuses, and non-transitory computer-readable medium described herein may further include operations, features, means, or instructions for determining that a first subset of semi-persistent scheduling configurations of the at least one semi-persistent scheduling configuration may be each configured for a respective slot format, and determining that a second subset of semi-persistent scheduling configurations of the at least one semi-persistent scheduling configuration may be not included in the first subset of semi-persistent scheduling configurations.

In some examples of the method, apparatuses, and non-transitory computer-readable medium described herein, determining the one or more semi-persistent scheduling occasions for receipt of the at least one downlink shared channel transmission may include operations, features, means, or instructions for determining that one or more of the first subset of semi-persistent scheduling configurations may be configured for respective slot formats that match the slot format of the slot.

Some examples of the method, apparatuses, and non-transitory computer-readable medium described herein may further include operations, features, means, or instructions for selecting a semi-persistent scheduling configuration of the second subset for each slot based on a highest priority or a lowest index of semi-persistent scheduling configurations of the second subset.

Some examples of the method, apparatuses, and non-transitory computer-readable medium described herein may further include operations, features, means, or instructions for selecting a semi-persistent scheduling configuration of the first subset and the second subset for each slot of the set of slots based on a highest priority or a lowest index of semi-persistent scheduling configurations of the first subset and the second subset.

Some examples of the method, apparatuses, and non-transitory computer-readable medium described herein may further include operations, features, means, or instructions for receiving, from the base station, a slot format indication that indicates the slot format of the slot.

Some examples of the method, apparatuses, and non-transitory computer-readable medium described herein may further include operations, features, means, or instructions for determining that a semi-persistent scheduling occasion for receipt of the at least one downlink shared channel transmission at least partially overlaps with the uplink resources or guard resources of the slot based on determining the downlink resources.

Some examples of the method, apparatuses, and non-transitory computer-readable medium described herein may further include operations, features, means, or instructions for identifying an error condition based on the semi-persistent scheduling occasion at least partially overlapping with the uplink resources or the guard resources.

Some examples of the method, apparatuses, and non-transitory computer-readable medium described herein may further include operations, features, means, or instructions for refraining from monitoring the semi-persistent scheduling occasion for receipt of the at least one downlink shared channel transmission based on the semi-persistent scheduling occasion at least partially overlapping with the uplink resources or the guard resources, and monitoring a different semi-persistent scheduling occasion associated with a different semi-persistent scheduling configuration, where the different semi-persistent scheduling occasion does not overlap with the uplink resources or guard resources of the slot.

Some examples of the method, apparatuses, and non-transitory computer-readable medium described herein may further include operations, features, means, or instructions for determining a semi-persistent scheduling occasion of the semi-persistent scheduling occasions in the slot for receipt of the at least one downlink shared channel transmission based on a smallest index or highest priority of the semi-persistent scheduling occasions that does not include resources that overlap with the uplink resources or the guard resources of the slot.

Some examples of the method, apparatuses, and non-transitory computer-readable medium described herein may further include operations, features, means, or instructions for identifying that the at least one semi-persistent scheduling configuration includes an indication that semi-persistent scheduling occasions associated with the at least one semi-persistent scheduling configuration may be available for receipt of the at least one downlink shared channel transmission notwithstanding partial overlap with the uplink resources or the guard resources.

Some examples of the method, apparatuses, and non-transitory computer-readable medium described herein may further include operations, features, means, or instructions for receiving, from the base station, the at least one downlink shared channel transmission in downlink resources of the semi-persistent scheduling occasion including the resources that overlap with the uplink resources or the guard resources of the slot.

In some examples of the method, apparatuses, and non-transitory computer-readable medium described herein, the at least one downlink shared channel transmission may be received via coded bits on resources that may be rate-matched around the resources that overlap.

In some examples of the method, apparatuses, and non-transitory computer-readable medium described herein, the at least one downlink shared channel transmission may be punctured by the resources that overlap.

Some examples of the method, apparatuses, and non-transitory computer-readable medium described herein may further include operations, features, means, or instructions for performing blind decoding on the downlink resources of the semi-persistent scheduling occasion based on at least one rank configured at the UE.

In some examples of the method, apparatuses, and non-transitory computer-readable medium described herein, the downlink shared channel transmission may be decoded in accordance with a second rank that may be higher than a first rank based on performing the blind decoding.

Some examples of the method, apparatuses, and non-transitory computer-readable medium described herein may further include operations, features, means, or instructions for decoding the at least one downlink shared channel transmission using at least one modulation and coding scheme configured at the UE.

In some examples of the method, apparatuses, and non-transitory computer-readable medium described herein, the downlink shared channel transmission may be decoded in accordance with a second modulation and coding scheme that may be higher than a first modulation and coding scheme.

Some examples of the method, apparatuses, and non-transitory computer-readable medium described herein may further include operations, features, means, or instructions for decoding the at least one downlink shared channel transmission using at least one modulation order configured at the UE.

In some examples of the method, apparatuses, and non-transitory computer-readable medium described herein, the downlink shared channel transmission may be decoded in accordance with a second modulation order that may be higher than a first modulation order.

Some examples of the method, apparatuses, and non-transitory computer-readable medium described herein may further include operations, features, means, or instructions for receiving, via radio resource control signaling, medium access control element signaling, or downlink control information signaling, an indication of a rate matching configuration, a puncturing configuration, a rank configuration, a modulation and coding scheme configuration, a modulation order configuration, or a combination thereof.

In some examples of the method, apparatuses, and non-transitory computer-readable medium described herein, the at least one downlink shared channel transmission may be received in accordance with the indication.

Some examples of the method, apparatuses, and non-transitory computer-readable medium described herein may further include operations, features, means, or instructions for receiving, from the base station, an uplink grant that allocates resources of the slot for one or more uplink transmissions.

Some examples of the method, apparatuses, and non-transitory computer-readable medium described herein may further include operations, features, means, or instructions for determining that the one or more semi-persistent scheduling occasions overlaps with the resources allocated by the uplink grant.

Some examples of the method, apparatuses, and non-transitory computer-readable medium described herein may further include operations, features, means, or instructions for monitoring for the at least one downlink shared channel transmission in a subset of the resources of the one or more semi-persistent scheduling occasions that do not overlap with the resources allocated by the uplink grant.

Some examples of the method, apparatuses, and non-transitory computer-readable medium described herein may further include operations, features, means, or instructions for determining to monitor for the at least one downlink shared channel transmission or to transmit the one or more uplink transmissions based on a first priority associated with the one or more semi-persistent scheduling occasions and a second priority associated with the uplink grant.

In some examples of the method, apparatuses, and non-transitory computer-readable medium described herein, the determining to monitor for the at least one downlink shared channel transmission or to transmit the one or more uplink transmissions may be further based on a configuration received from the base station.

Some examples of the method, apparatuses, and non-transitory computer-readable medium described herein may further include operations, features, means, or instructions for determining to not monitor for the at least one downlink shared channel transmission and to not transmit the one or more uplink transmissions based on a first priority associated with the one or more semi-persistent scheduling occasions and a second priority associated with the uplink grant being a same priority.

In some examples of the method, apparatuses, and non-transitory computer-readable medium described herein, the one or more uplink transmissions include an uplink shared channel transmission, an uplink control channel transmission, a sounding reference signal transmission, or a combination thereof.

In some examples of the method, apparatuses, and non-transitory computer-readable medium described herein, the uplink grant includes a configured grant.

A method of wireless communications at a base station is described. The method may include identifying a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, transmitting, to a UE, a set of semi-persistent scheduling configurations for receiving, by the UE, downlink transmissions from the base station, where each of the set of semi-persistent scheduling configurations is configured for one or more of the first set of slots and for corresponding slots of the subsequent pluralities of slots based on the slot format of each of the first set of slot, and communicating with the UE based on the set of semi-persistent scheduling configurations.

An apparatus for wireless communications at a base station is described. The apparatus may include a processor, memory coupled with the processor, and instructions stored in the memory. The instructions may be executable by the processor to cause the apparatus to identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, transmit, to a UE, a set of semi-persistent scheduling configurations for receiving, by the UE, downlink transmissions from the base station, where each of the set of semi-persistent scheduling configurations is configured for one or more of the first set of slots and for corresponding slots of the subsequent pluralities of slots based on the slot format of each of the first set of slot, and communicate with the UE based on the set of semi-persistent scheduling configurations.

Another apparatus for wireless communications at a base station is described. The apparatus may include means for identifying a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, transmitting, to a UE, a set of semi-persistent scheduling configurations for receiving, by the UE, downlink transmissions from the base station, where each of the set of semi-persistent scheduling configurations is configured for one or more of the first set of slots and for corresponding slots of the subsequent pluralities of slots based on the slot format of each of the first set of slot, and communicating with the UE based on the set of semi-persistent scheduling configurations.

A non-transitory computer-readable medium storing code for wireless communications at a base station is described. The code may include instructions executable by a processor to identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, transmit, to a UE, a set of semi-persistent scheduling configurations for receiving, by the UE, downlink transmissions from the base station, where each of the set of semi-persistent scheduling configurations is configured for one or more of the first set of slots and for corresponding slots of the subsequent pluralities of slots based on the slot format of each of the first set of slot, and communicate with the UE based on the set of semi-persistent scheduling configurations.

In some examples of the method, apparatuses, and non-transitory computer-readable medium described herein, transmitting the set of semi-persistent scheduling configurations may include operations, features, means, or instructions for transmitting a periodicity value such that each of the set of semi-persistent scheduling configurations may be configured for the one or more of the first set of slots and for corresponding slots of the subsequent pluralities of slots based on the periodicity value.

In some examples of the method, apparatuses, and non-transitory computer-readable medium described herein, the periodicity value specifies a value n number of slots such that a particular semi-persistent scheduling configuration of the set of semi-persistent scheduling configurations may be configured for the nth slot in the first set of slots and the nth slot in the subsequent pluralities of slots.

Some examples of the method, apparatuses, and non-transitory computer-readable medium described herein may further include operations, features, means, or instructions for transmitting the set of semi-persistent scheduling configurations includes a first semi-persistent scheduling configuration of the set of semi-persistent scheduling configurations that may be configured for more than one slot of the first set of slots and for corresponding slots of the subsequent pluralities of slots, where the more than one slot each share a same slot format.

In some examples of the method, apparatuses, and non-transitory computer-readable medium described herein, communicating with the UE may include operations, features, means, or instructions for transmitting the downlink transmissions to the UE in downlink resources of the first set of slots allocated based on the set of semi-persistent scheduling configurations.

In some examples of the method, apparatuses, and non-transitory computer-readable medium described herein, at least one downlink transmission may be transmitted in at least a portion of the downlink resources of the at least one slot.

In some examples of the method, apparatuses, and non-transitory computer-readable medium described herein, transmitting the set of semi-persistent scheduling configurations may include operations, features, means, or instructions for transmitting a radio resource control signal indicating the set of semi-persistent scheduling configurations.

In some examples of the method, apparatuses, and non-transitory computer-readable medium described herein, each of the set of semi-persistent scheduling configurations indicates a timing offset corresponding to a first subframe of a respective slot, duration of time-domain resources of the respective slot, frequency domain resources of the respective slot, or a combination thereof.

A method of wireless communications at a base station is described. The method may include identifying a slot format for a slot of a set of slots, where the slot format for the slot specifies uplink resources and downlink resources separated in a frequency domain, transmitting, to a UE, at least one semi-persistent scheduling configuration for receiving, by the UE, downlink transmissions from the base station, determining, for the slot of the set of slots, one or more semi-persistent scheduling occasions for transmission of at least one downlink shared channel transmission based on the slot format of the slot and the at least one semi-persistent scheduling configuration, and communicating with the UE based on determining the semi-persistent scheduling occasions for the slot.

An apparatus for wireless communications at a base station is described. The apparatus may include a processor, memory coupled with the processor, and instructions stored in the memory. The instructions may be executable by the processor to cause the apparatus to identify a slot format for a slot of a set of slots, where the slot format for the slot specifies uplink resources and downlink resources separated in a frequency domain, transmit, to a UE, at least one semi-persistent scheduling configuration for receiving, by the UE, downlink transmissions from the base station, determine, for the slot of the set of slots, one or more semi-persistent scheduling occasions for transmission of at least one downlink shared channel transmission based on the slot format of the slot and the at least one semi-persistent scheduling configuration, and communicate with the UE based on determining the semi-persistent scheduling occasions for the slot.

Another apparatus for wireless communications at a base station is described. The apparatus may include means for identifying a slot format for a slot of a set of slots, where the slot format for the slot specifies uplink resources and downlink resources separated in a frequency domain, transmitting, to a UE, at least one semi-persistent scheduling configuration for receiving, by the UE, downlink transmissions from the base station, determining, for the slot of the set of slots, one or more semi-persistent scheduling occasions for transmission of at least one downlink shared channel transmission based on the slot format of the slot and the at least one semi-persistent scheduling configuration, and communicating with the UE based on determining the semi-persistent scheduling occasions for the slot.

A non-transitory computer-readable medium storing code for wireless communications at a base station is described. The code may include instructions executable by a processor to identify a slot format for a slot of a set of slots, where the slot format for the slot specifies uplink resources and downlink resources separated in a frequency domain, transmit, to a UE, at least one semi-persistent scheduling configuration for receiving, by the UE, downlink transmissions from the base station, determine, for the slot of the set of slots, one or more semi-persistent scheduling occasions for transmission of at least one downlink shared channel transmission based on the slot format of the slot and the at least one semi-persistent scheduling configuration, and communicate with the UE based on determining the semi-persistent scheduling occasions for the slot.

Some examples of the method, apparatuses, and non-transitory computer-readable medium described herein may further include operations, features, means, or instructions for selecting one or more of the at least one semi-persistent scheduling configuration for transmitting the downlink transmissions for the slot based on a highest priority of the at least one semi-persistent scheduling configuration or a lowest index of the at least one semi-persistent scheduling configuration.

Some examples of the method, apparatuses, and non-transitory computer-readable medium described herein may further include operations, features, means, or instructions for determining that a semi-persistent scheduling occasion for receiving the downlink shared channel transmission allocated by the at least one semi-persistent scheduling configuration overlaps with the uplink resources for the slot or guard resources for the slot, and determining the downlink transmissions for the slot may be to be received in the resources of the semi-persistent scheduling occasion that may be not overlapping with the uplink resources for the slot or the guard resources for the slot.

Some examples of the method, apparatuses, and non-transitory computer-readable medium described herein may further include operations, features, means, or instructions for transmitting, to the UE, a slot format indication that allocates at least a portion of the uplink resources for the slot.

In some examples of the method, apparatuses, and non-transitory computer-readable medium described herein, the at least one semi-persistent scheduling configuration may be not associated with a downlink bandwidth or a downlink bandwidth part index.

Some examples of the method, apparatuses, and non-transitory computer-readable medium described herein may further include operations, features, means, or instructions for determining that a set of semi-persistent scheduling configurations may be each configured for a respective slot format.

In some examples of the method, apparatuses, and non-transitory computer-readable medium described herein, determining the one or more semi-persistent scheduling occasions for receipt of the at least one downlink shared channel transmission may include operations, features, means, or instructions for determining that a subset of the set of semi-persistent scheduling configurations may be configured for respective slot formats that match the slot format of the slot.

Some examples of the method, apparatuses, and non-transitory computer-readable medium described herein may further include operations, features, means, or instructions for selecting one of the subset of semi-persistent scheduling configurations for transmission of the at least one downlink shared channel transmission during the slot based on a highest priority or a lowest index of the subset of semi-persistent scheduling configurations.

In some examples of the method, apparatuses, and non-transitory computer-readable medium described herein, determining the one or more semi-persistent scheduling occasions for transmission of the at least one downlink shared channel transmission may include operations, features, means, or instructions for determining that none of the set of semi-persistent scheduling configurations may be configured for respective slot formats that match the slot format of the slot.

Some examples of the method, apparatuses, and non-transitory computer-readable medium described herein may further include operations, features, means, or instructions for selecting one of the semi-persistent scheduling configurations for transmission of the at least one downlink shared channel transmission during the slot based on a highest priority or a lowest index of the semi-persistent scheduling configurations in accordance with determining that none of the set of semi-persistent scheduling configurations may be configured for respective slot formats that match the slot format of the slot.

Some examples of the method, apparatuses, and non-transitory computer-readable medium described herein may further include operations, features, means, or instructions for refraining from transmitting the downlink transmissions in the first slot based on determining that none of the set of semi-persistent scheduling configurations being configured for respective slot formats that match the slot format of the slot.

Some examples of the method, apparatuses, and non-transitory computer-readable medium described herein may further include operations, features, means, or instructions for identifying that each of the at least one semi-persistent scheduling configuration includes an indication of a downlink bandwidth, a downlink bandwidth part index, or both, where determining the semi-persistent scheduling configuration that may be configured for each slot may be further based on each of the at least one semi-persistent scheduling configuration including the indication of the downlink bandwidth, the downlink bandwidth part index, or both.

Some examples of the method, apparatuses, and non-transitory computer-readable medium described herein may further include operations, features, means, or instructions for determining that a first subset of semi-persistent scheduling configurations of the at least one semi-persistent scheduling configuration may be each configured for a respective slot format, and determining that a second subset of semi-persistent scheduling configurations of the at least one semi-persistent scheduling configuration may be not included in the first subset of semi-persistent scheduling configurations.

In some examples of the method, apparatuses, and non-transitory computer-readable medium described herein, determining the one or more semi-persistent scheduling occasions for transmission of the at least one downlink shared channel transmission may include operations, features, means, or instructions for determining that one or more of the first subset of semi-persistent scheduling configurations may be configured for respective slot formats that match the slot format of the slot.

Some examples of the method, apparatuses, and non-transitory computer-readable medium described herein may further include operations, features, means, or instructions for selecting a semi-persistent scheduling configuration of the second subset for each slot based on a highest priority or a lowest index of semi-persistent scheduling configurations of the second subset.

Some examples of the method, apparatuses, and non-transitory computer-readable medium described herein may further include operations, features, means, or instructions for selecting a semi-persistent scheduling configuration of the first subset and the second subset for each slot of the set of slots based on a highest priority or a lowest index of semi-persistent scheduling configurations of the first subset and the second subset.

Some examples of the method, apparatuses, and non-transitory computer-readable medium described herein may further include operations, features, means, or instructions for transmitting, to the UE, a slot format indication that indicates the slot format of the slot.

Some examples of the method, apparatuses, and non-transitory computer-readable medium described herein may further include operations, features, means, or instructions for determining that a semi-persistent scheduling occasion for receipt of the at least one downlink shared channel transmission at least partially overlaps with the uplink resources or guard resources of the slot based on determining the downlink resources.

Some examples of the method, apparatuses, and non-transitory computer-readable medium described herein may further include operations, features, means, or instructions for identifying an error condition based on the semi-persistent scheduling occasion at least partially overlapping with the uplink resources or the guard resources.

Some examples of the method, apparatuses, and non-transitory computer-readable medium described herein may further include operations, features, means, or instructions for refraining from transmitting the downlink shared channel transmission in the semi-persistent scheduling occasion based on the semi-persistent scheduling occasion at least partially overlapping with the uplink resources or the guard resources, and transmitting the downlink shared channel transmission in a different semi-persistent scheduling occasion associated with a different semi-persistent scheduling configuration, where the different semi-persistent scheduling occasion does not overlap with the uplink resources or guard resources of the slot.

Some examples of the method, apparatuses, and non-transitory computer-readable medium described herein may further include operations, features, means, or instructions for determining a semi-persistent scheduling occasion of the semi-persistent scheduling occasions in the slot for transmission of the at least one downlink shared channel transmission based on a smallest index or highest priority of the semi-persistent scheduling occasions that does not include resources that overlap with the uplink resources or the guard resources of the slot.

Some examples of the method, apparatuses, and non-transitory computer-readable medium described herein may further include operations, features, means, or instructions for identifying that the at least one semi-persistent scheduling configuration includes an indication that semi-persistent scheduling occasions associated with the at least one semi-persistent scheduling configuration may be available for transmission of the at least one downlink shared channel transmission notwithstanding partial overlap with the uplink resources or the guard resources.

Some examples of the method, apparatuses, and non-transitory computer-readable medium described herein may further include operations, features, means, or instructions for transmitting, to the UE, the at least one downlink shared channel transmission in downlink resources of the semi-persistent scheduling occasion that includes the resources that overlap with the uplink resources or the guard resources of the slot.

In some examples of the method, apparatuses, and non-transitory computer-readable medium described herein, the at least one downlink shared channel transmission may be transmitted via coded bits on resources that may be rate-matched around the resources that overlap.

In some examples of the method, apparatuses, and non-transitory computer-readable medium described herein, the at least one downlink shared channel transmission may be punctured by the resources that overlap.

Some examples of the method, apparatuses, and non-transitory computer-readable medium described herein may further include operations, features, means, or instructions for encoding the downlink resources of the semi-persistent scheduling occasion using a rank selected based on the semi-persistent scheduling occasion including the resources that overlap.

Some examples of the method, apparatuses, and non-transitory computer-readable medium described herein may further include operations, features, means, or instructions for selecting a second rank for the encoding that may be higher than a first rank based on the semi-persistent scheduling occasion including the resources that overlap.

Some examples of the method, apparatuses, and non-transitory computer-readable medium described herein may further include operations, features, means, or instructions for encoding the downlink resources of the semi-persistent scheduling occasion using a modulation and coding scheme selected based on the semi-persistent scheduling occasion including the resources that overlap.

Some examples of the method, apparatuses, and non-transitory computer-readable medium described herein may further include operations, features, means, or instructions for selecting a second modulation and coding scheme for the encoding that may be higher than a first modulation and coding scheme based on the semi-persistent scheduling occasion including the resources that overlap.

Some examples of the method, apparatuses, and non-transitory computer-readable medium described herein may further include operations, features, means, or instructions for encoding the downlink resources of the semi-persistent scheduling occasion using a modulation order selected based on the semi-persistent scheduling occasion including the resources that overlap.

Some examples of the method, apparatuses, and non-transitory computer-readable medium described herein may further include operations, features, means, or instructions for selecting a second modulation order for the encoding that may be higher than a first modulation order based on the semi-persistent scheduling occasion including the resources that overlap.

Some examples of the method, apparatuses, and non-transitory computer-readable medium described herein may further include operations, features, means, or instructions for transmitting, via radio resource control signaling, medium access control element signaling, or downlink control information signaling, an indication of a rate matching configuration, a puncturing configuration, a rank configuration, a modulation and coding scheme configuration, a modulation order configuration, or a combination thereof.

In some examples of the method, apparatuses, and non-transitory computer-readable medium described herein, the at least one downlink shared channel transmission may be transmitted in accordance with the indication.

Some examples of the method, apparatuses, and non-transitory computer-readable medium described herein may further include operations, features, means, or instructions for transmitting, to the UE, an uplink grant that allocates resources of the slot for one or more uplink transmissions.

Some examples of the method, apparatuses, and non-transitory computer-readable medium described herein may further include operations, features, means, or instructions for determining that the one or more semi-persistent scheduling occasions overlaps with the resources allocated by the uplink grant.

Some examples of the method, apparatuses, and non-transitory computer-readable medium described herein may further include operations, features, means, or instructions for transmitting the at least one downlink shared channel transmission in a subset of the resources of the one or more semi-persistent scheduling occasions that do not overlap with the resources allocated by the uplink grant.

Some examples of the method, apparatuses, and non-transitory computer-readable medium described herein may further include operations, features, means, or instructions for determining to transmit the at least one downlink shared channel transmission or to monitor for receipt of the one or more uplink transmissions based on a first priority associated with the one or more semi-persistent scheduling occasions and a second priority associated with the uplink grant.

Some examples of the method, apparatuses, and non-transitory computer-readable medium described herein may further include operations, features, means, or instructions for determining to transmit the at least one downlink shared channel transmission or to monitor for receipt of the one or more uplink transmissions may be further based on a configuration received from the base station.

Some examples of the method, apparatuses, and non-transitory computer-readable medium described herein may further include operations, features, means, or instructions for determining to not monitor for receipt of the at least one downlink shared channel transmission or to transmit the one or more uplink transmissions based on a first priority associated with the one or more semi-persistent scheduling occasions and a second priority associated with the uplink grant being a same priority.

In some examples of the method, apparatuses, and non-transitory computer-readable medium described herein, the one or more uplink transmissions include an uplink shared channel transmission, an uplink control channel transmission, a sounding reference signal transmission, or a combination thereof.

In some examples of the method, apparatuses, and non-transitory computer-readable medium described herein, the uplink grant includes a configured grant.

DETAILED DESCRIPTION

Figure 1:
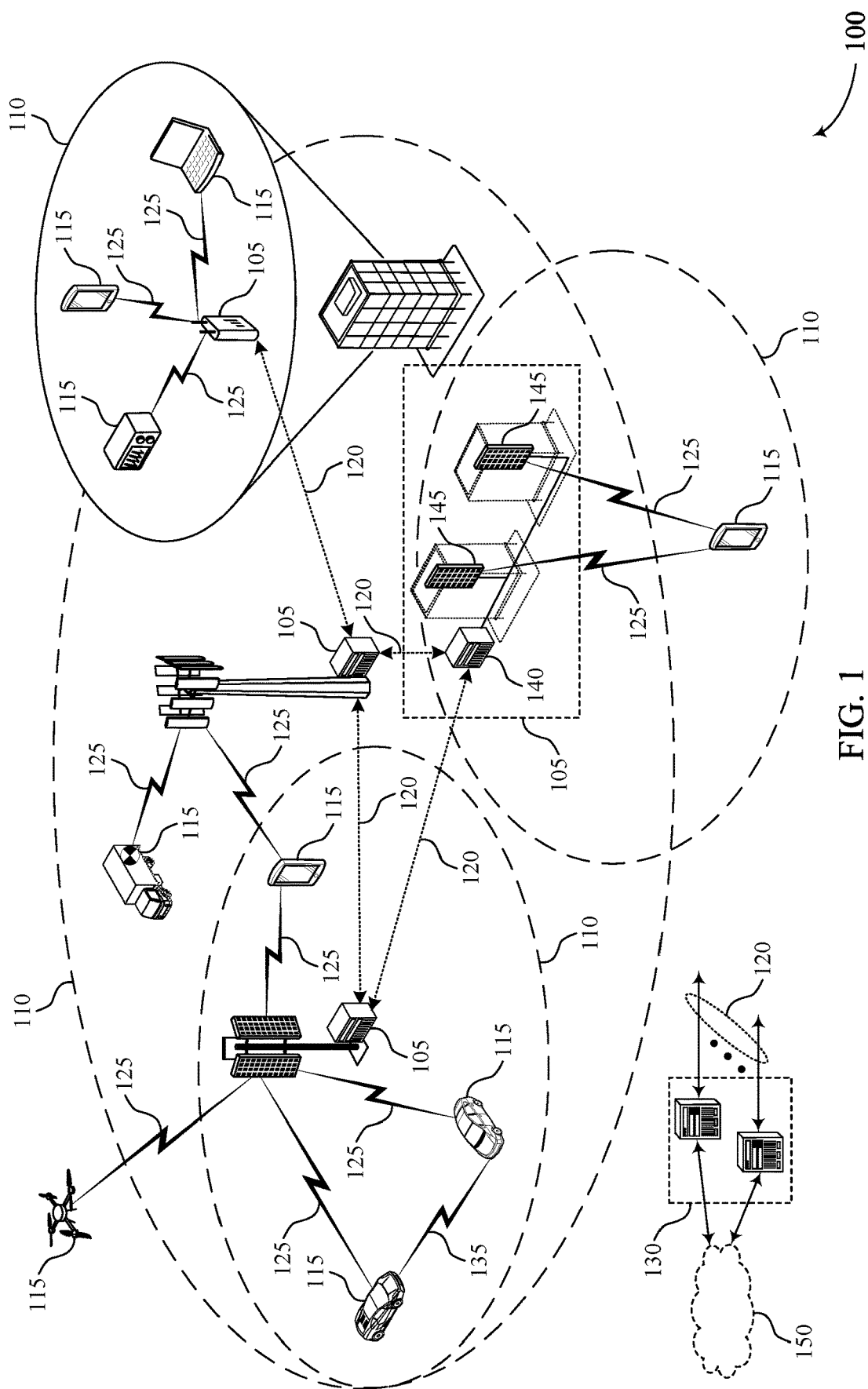
FIG. 1 illustrates an example of a system for wireless communications that supports semi-persistent scheduling for subband full-duplex slots in accordance with aspects of the present disclosure.

Some wireless radio access technologies (RATs) may support operation in accordance with a full-duplex mode. A full-duplex mode allows devices to perform both uplink and downlink communication in the same transmission time interval. A full-duplex mode may be in-band full-duplex, in which devices may transmit and receive on the same or overlapping time and frequency resources, or subband full-duplex (also referred to as flexible duplex), in which devices may transmit and receive at the same (or overlapping) time resources but in different frequency resources. More particularly, in a subband full-duplex mode, the downlink resources may be separated from the uplink resources in a frequency domain. A set of contiguous slots may be configured with multiple slot configurations. For example, a four slots may include two half-duplex slots, including one uplink slot and one downlink slot, and two full-duplex slots.

The resources of the pattern of slots may be allocated using various uplink and downlink grants. For example, an uplink half-duplex slot or a subband full-duplex (SBFD) slot may have uplink resources that are allocated using configured grants. A downlink half-duplex slot or a SBFD slot may have downlink resources that are allocated using semi-persistent scheduling (SPS). Aspects of the disclosure described herein provide for techniques for SPS configurations, selection among multiple SPS configurations that are available for a slot, and resource conflict resolution.

In accordance with techniques described herein, a UE may be configured with a plurality of slots that include half-duplex and SBFD slots, and a pattern of slot formats (e.g., half-duplex and SBFD slots) of the plurality of slots may be repeated in subsequent pluralities of slots. A base station may transmit, to the UE, a plurality of SPS configurations for receiving downlink transmissions from the base station. Each SPS configuration may be configured for one or more of the plurality of slots and for corresponding slot formats of the subsequent pluralities. That is, for the pattern of slot formats in the plurality of slots, an SPS configuration that is configurated for slot 0 in the plurality may be repeated for slot 0 in the subsequent plurality. One configuration may specify SPS resources in slot 0, slot 0+P, slot 0+2P, etc., where P is the periodicity (e.g., P=4 for a repeating pattern of 4 slots). Another configuration may specify SPS resources in slot 1, 1+P, slot 1+2P, etc. Another configuration may specify more than one slot in a pattern. For example, multiple SPS configurations may be defined in a grant-centric manner, such that SPS 1 is applied to slots {1, 2}+P, where P is the periodicity.

Other techniques described herein provide for a one or more of SPS configurations that may be applicable to one or more slots in having various slot formats. The UE may receive the one or SPS configurations and determine at least SPS configurations that may match a slot format for receiving the downlink transmissions. In some cases, the determination is based on whether each of the SPS configurations indicated a downlink bandwidth or downlink bandwidth part (e.g., whether the SPS configurations specify frequency resources for a slot). In such cases, the downlink resources may default to an SPS occasion (and the corresponding SPS configuration) with the lowest index or highest priority in the slot. In other cases, the downlink resources may default to the SPS occasion that does have overlapping resources with uplink resources or guard resources in a slot. For example, if multiple SPS configurations are available for a particular slot, and a first SPS configuration allocates an SPS occasion that overlaps with uplink resources of a SBFD slot and a second SPS configuration allocates an SPS occasion that allocates downlink resources in the SBFD slot, then the second SPS configuration may be selected for receiving the downlink communication. Other techniques for selecting among multiple SPS configurations are also described herein.

Further techniques described herein provide for device behavior when an SPS occasion allocated by an SPS configuration overlaps with uplink or guard resources of a slot, such as a SBFD slot. In one example, if an SPS occasion overlaps with such resources, the UE may identify an error condition. In another example, the SPS occasion is skipped, and the devices may identify an SPS occasion with the lowest index or highest priority that does not overlap with those resources. In other examples, the SPS occasion with the overlapping resources may be used for downlink transmission, but the downlink resources in the occasion may be used and various encoding techniques may be used to format the downlink transmission for the downlink resources. Encoding techniques may include transmission of the downlink transmission with a higher rank, higher modulation and coding scheme, higher modulation order, etc. than would have been used for an SPS occasion that does not have overlapping resources. The overlapping resources may be rate-matched with or punctured by the downlink transmission.

Particular aspects of the subject matter described herein may be implemented to realize one or more advantages. The described techniques may support improvements in the SPS and SBFD framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described with respect to a wireless communications system, various communication resources, and a process flow diagram. Aspects of the disclosure are further illustrated by and described with reference to apparatus diagrams, system diagrams, and flowcharts that relate to semi-persistent scheduling for subband full-duplex slots.

FIG. 1 illustrates an example of a wireless communications system 100 that supports semi-persistent scheduling for subband full-duplex slots in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a subband, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some examples, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more subbands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support various communications modes such as half and full-duplex modes. In some scenarios, a base station 105 may operate in a full-duplex mode and a UE 115 may operate in a half-duplex mode. In other scenarios, both a base station 105 and a UE 115 may operate in full-duplex mode. In yet other scenarios, a UE 115 may operate in a full-duplex mode and a base station 105 may operate in a half-duplex mode. In these cases, various resources may be allocated to avoid interference between communications between the various UEs 115 and base stations 105. There may be two types of full-duplex modes supported by the wireless communications system 100. In an in-band full-duplex (IBFD) mode, a base station 105 and a UE 115 may transmit and receive using the same or overlapping time and frequency resources. That is, the uplink and the downlink resource may share the same IBFD time/frequency resources, such that there may be a full or partial overlap in the uplink and downlink resources. In a subband FDD (SBFD) (also referred to flexible duplex), the UE 115 and the base station 105 may transmit and receive at the same time but using different frequency resources. In an SBFD slot, the downlink resources may be separated from the uplink resource in a frequency domain.

Various systems may allocate NR frequency bands that are paired (e.g., various uplink bands are paired with various downlink bands), or unpaired spectrum (e.g., the TDD slots may be allocated for either uplink or downlink communications). In some examples, the bands of the unpaired spectrum may be configured for SBFD slots, such that the slot includes both uplink and downlink resources (and guard resources). That is, SBFD mode may be performed in the unpaired spectrum. However, it should be understood that the techniques described herein are not limited to unpaired spectrum and that the techniques may be performed in various frequency bands.

Various SPS techniques for allocation of downlink transmissions of physical downlink shared channel (PDSCH) without having to receive the individual resource allocations for a PDSCH are provided. That is, the UE 115 may be configured to allow periodic downlink transmissions on a set of resource blocks (e.g., time and frequency resources) with a MCS that is configured via SPS. In some examples, multiple SPS configurations may be indicated to the UE 115. In accordance with techniques described herein, a UE 115 and a base station may be configured with a plurality of slots that include half-duplex and SBFD slots, and a pattern of slot formats (e.g., half-duplex and SBFD slots) of the plurality of slots may be repeated in subsequent pluralities of slots. The base station 105 may transmit, to the UE, a plurality of SPS configurations for receiving downlink transmissions from the base station. Each SPS configuration may be configured for one or more slot formats of the plurality of slots and for corresponding slot formats of the subsequent pluralities.

Further techniques described herein provide for selection among a plurality of SPS configurations available for a slot based on slot formats, indices or priorities of the SPS configurations, and overlapping resources. In some examples, an SPS occasion may overlap with uplink and/or guard resources of an SBFD slot. These techniques described herein provide for UE 115 and base station 105 handling and or limitation of such cases, as well as conflict resolution. These and other techniques are described further with respect to the following figures.

Figure 2:
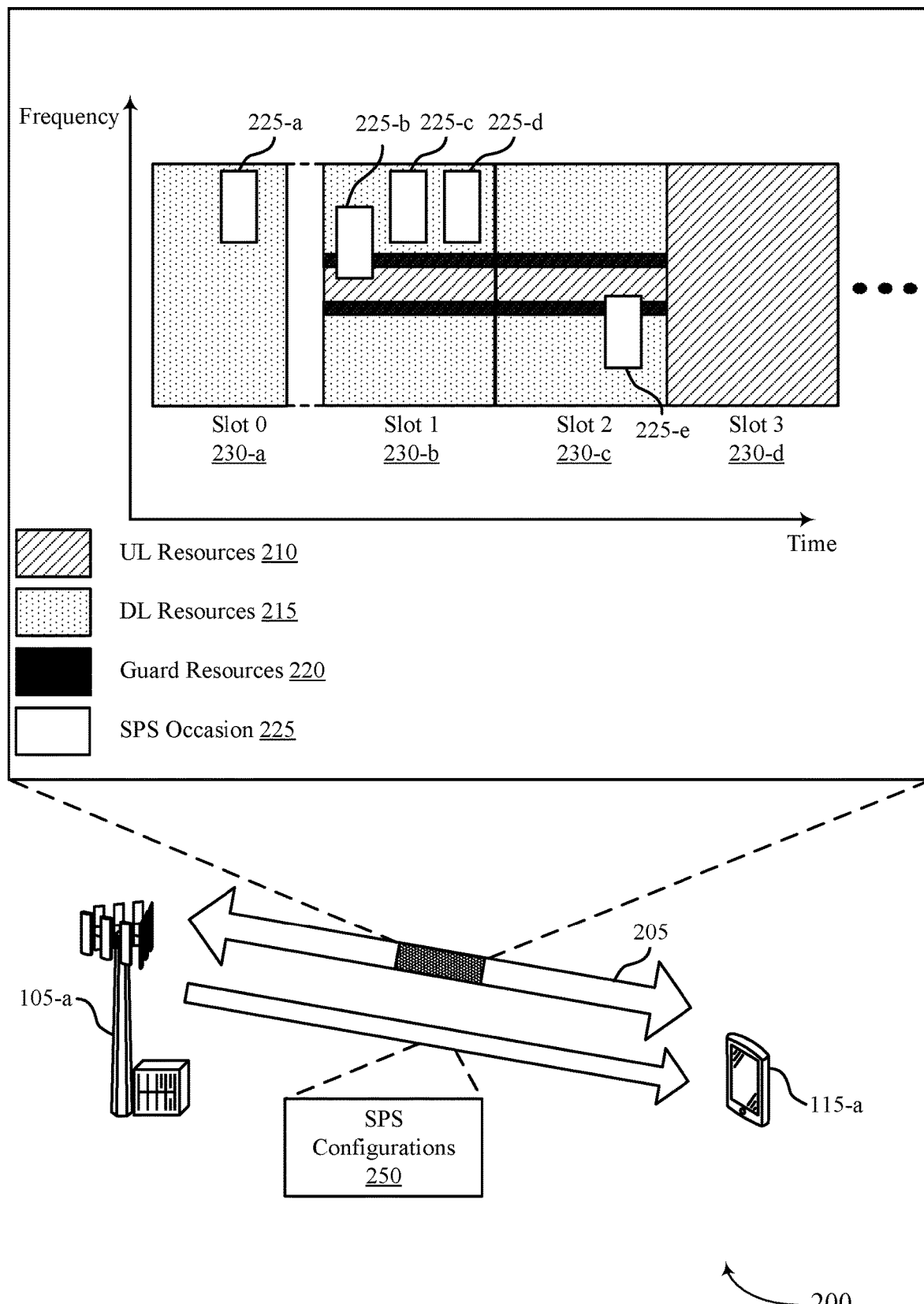
FIG. 2 illustrates an example of a wireless communications system that supports semi-persistent scheduling for subband full-duplex slots in accordance with aspects of the present disclosure.

FIG. 2 illustrates an example of a wireless communications system 200 that supports semi-persistent scheduling for subband full-duplex slots in accordance with aspects of the present disclosure. In some examples, wireless communications system 200 may implement aspects of wireless communications system 100. The wireless communications system 200 includes a base station 105-*a* and a UE 115-*a*, which may be examples of the corresponding devices of FIG. 1. The base station 105-*a* and the UE 115-*a* may perform communications 205. Generally, the wireless communications system 200 may illustrate an example of communications 205 between the UE 115-*a* and the base station 105-*a*.

The communications 205 may be performed in accordance of a plurality of slots 230. Each slot 230 may be configured with a slot format that indicates various resources that may be allocated for communication during the slot 230. For example, slot 0 (slot 230-*a*) is configured with downlink resources 215, slot 1 (slot 230-*b*) is configured with both uplink resources 210 and downlink resources 215 as well as guard resources 220 that separate the uplink resources 210 and the downlink resources 215. Slot 2 (slot 230-*c*) includes a same slot format as slot 230-*b*. Slots 230-*b* and 230-*c* may be examples of a SBFD slot, since these slots include uplink resources 210 and downlink resources 215 separated in the frequency domain. It should be understood that a SBFD slot may have other resource configurations than illustrated by slots 230-*b* and 230-*c*. Slot 3 (slot 230-*d*) includes uplink resources 210.

In accordance with the slot formats of the slots 230, the base station 105 may allocate resources for communications within the slots 230-*b*. For example, the base station 105 may transmit an uplink grant that allocates some of the uplink resources 210, as indicated by the slot formats, for a physical uplink shared channel (PUSCH) transmission. The base station 105 may also transmit a plurality of SPS configurations 250, which allocate resources of the slots 230 for downlink transmissions, such as a PDSCH transmission. SPS may allow the UE 115 to perform the downlink transmission (e.g., a PDSCH transmission) without having to receive individual resource allocations for the PDSCH on the physical downlink control channel (PDCCH). In accordance with the SPS configurations 250, the UE 115-*a* may be configured to allow periodic downlink transmission on a set of resource blocks (e.g., specific time and frequency domain resources) with an indicated modulation and coding scheme (MCS). In some examples, the plurality of SPS configurations 250 may be transmitted using radio resource control signaling.

Due to a set of slots 230 having mixed half-duplex and SBFD slots, an SPS occasion 225 instance may occur at the SBFD slot where the downlink frequency resources are different from other slots. This may cause contention with uplink resources 210. To reduce these conflicts, the techniques described herein provide for multiple SPS configurations and rules for resolving the contention between SPS downlink resources and uplink resources 210.

Each of the SPS configurations 250 may specify a timing offset regarding subframe 0 (e.g., the first subframe) in the slot 230, time-domain resources (e.g., offset and duration) in the slot 230, and frequency domain resources in the slot 230. These parameters may define an SPS occasion 225, in which a downlink transmission (e.g., a PDSCH) may be received. Thus, each SPS occasion 225 may correspond to one of the SPS configurations 250. The UE 115-*a* and the base station 105-*a* may determine which SPS occasion 225 in a slot 230 in accordance with techniques described herein. In some examples, an SPS occasion 225 may overlap with uplink resources 210 or guard resources 220 in a slot. The techniques described herein may provide for determination of resources for receiving a downlink communication when such an occasion occurs.

Figure 3:
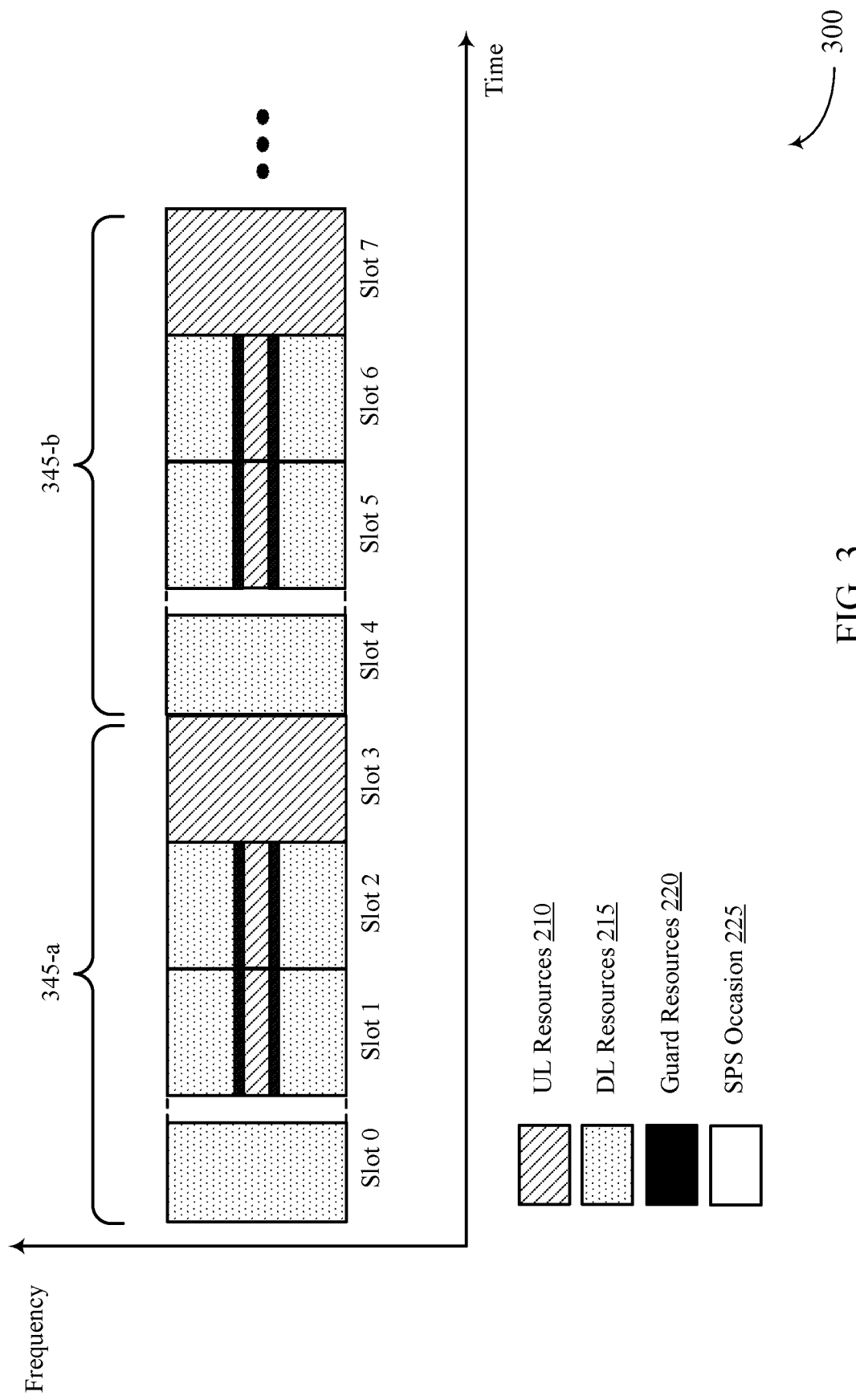
FIG. 3 illustrates an example of a slot structure that supports semi-persistent scheduling for subband full-duplex slots in accordance with aspects of the present disclosure.

FIG. 3 illustrates an example of a slot structure 300 that supports semi-persistent scheduling for subband full-duplex slots in accordance with aspects of the present disclosure. In some examples, slot structure 300 may implement aspects of wireless communications system 100. The slot structure 300 may be implemented by a UE 115 and a base station 105 as described with respect to FIGS. 1 and 2. The slot structure includes a first plurality of slots 345-*a* and a subsequent plurality of slots 345-*b*. Each slot includes an allocation of resources, which may be referred to as a slot structure. For example, slot 0 includes a slot structure specifying downlink resources 215 (e.g., a half-duplex slot). Slots 1 and 2 may be examples of SBFD slots that include a slot structure specifying both uplink resources 210 and downlink resources 215. The uplink resources 210 and downlink resources 215 may be separated by guard resources 220. Slot 3 includes a slot structure specifying uplink resources 210 (e.g., a half-duplex slot). In accordance with some implementations (e.g., some operating modes), the pattern of slot structures of the first plurality of slots 345-*a* may be repeated in the second plurality of slots 345-*b* as well as in subsequent pluralities of slots, as illustrated in FIG. 3.

SPS configurations (e.g., SPS configurations 250 of FIG. 2) may be transmitted to a UE 115, and the SPS configurations may allocate SPS occasions in the plurality of slots. In SPS configuration technique, the SPS configurations may be "interlace-centric," in that each SPS configuration applies to a slot of the plurality of slots 345-*a* and to the corresponding slot in the second plurality of slots 345-*b*. For example, a first SPS configuration may specify SPS occasion (e.g., SPS occasion 225 of FIG. 2) resources in slots 0, 0+P, 0+2P, etc. where P is the periodicity (e.g., P=4 in FIG. 3). A second SPS configuration may specify SPS occasion resources in slot 1, 1+P, 1+2P, etc. A third SPS configuration may specify SPS occasion resources in slot 2, slot 2+P, 2+2P, etc. The SPS configurations may specify a timing offset regarding subframe 0 in the respective slot, time-domain resources (offset and duration) in a slot, and frequency domain resources.

In other example, the SPS configuration may allocation SPS occasion in slots based on a grant-centric format. In FIG. 3, a first SPS configuration may be applied to slots {1, 2}+P where P is the periodicity. A second SPS configuration may be applied to slot {0}+P. This technique may be used when the slot format is shared between multiple slots in a plurality of slots 345. As illustrated, slots 1 and 2 share the same SBFD pattern. Thus, using this technique, the signaling to configure the slots (e.g., RRC signaling) may be more efficient (e.g., use fewer resources). Using these techniques, the UE may monitor the SPS occasions that are configured by the applicable SPS configurations for downlink communications. The UE 115 may also decode the downlink transmissions in accordance with an MCS indicated by the SPS configuration.

Figure 4:
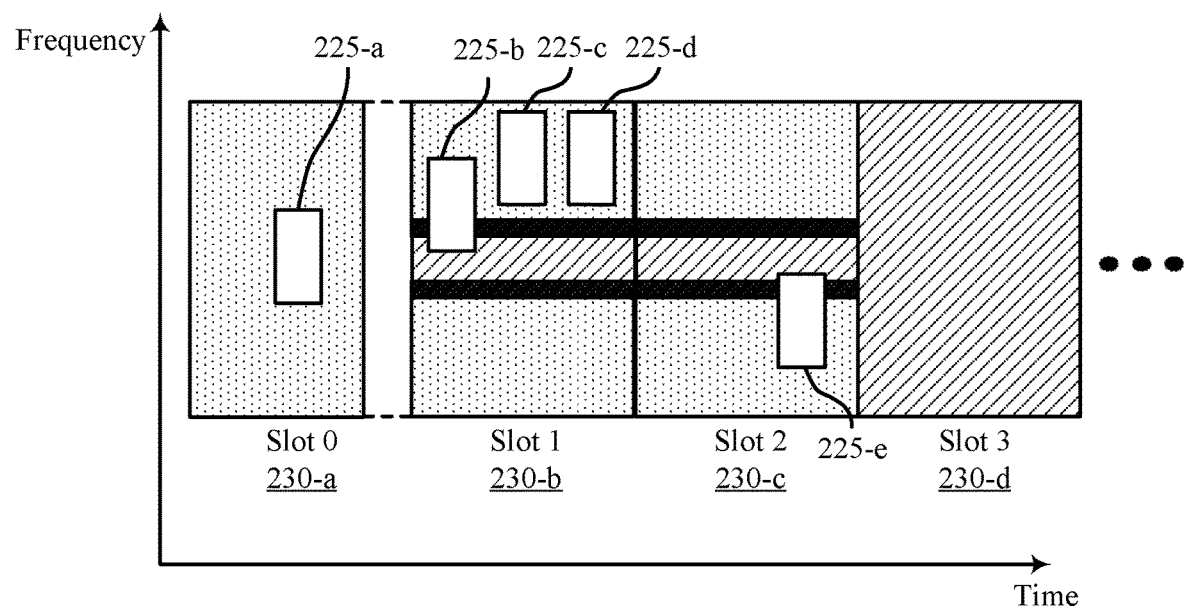
FIG. 4 illustrates an example of a slot structure that supports semi-persistent scheduling for subband full-duplex slots in accordance with aspects of the present disclosure.
Figure 4:
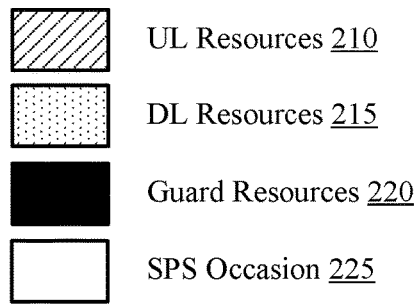

FIG. 4 illustrates an example of a slot structure 400 that supports semi-persistent scheduling for subband full-duplex slots in accordance with aspects of the present disclosure. In some examples, slot structure 400 may implement aspects of wireless communications system 100. The slot structure 400 may be implemented by a UE 115 and a base station 105 as described with respect to FIGS. 1 through 3. Each slot includes an allocation of resources which may be referred to as a slot structure. For example, slot 0 includes a slot structure specifying downlink resources 215 (e.g., a half-duplex slot). Slots 1 and 2 may be examples of SBFD slots that include a slot structure specifying both uplink resources 210 and downlink resources 215. The uplink resources 210 and downlink resources 215 may be separated by guard resources 220. Slot 3 includes a slot structure specifying uplink resources 210 (e.g., a half-duplex slot).

SPS configurations (e.g., SPS configurations 250 of FIG. 2) may be transmitted to a UE 115, and the SPS configurations may allocate SPS occasions 225 that may be applicable to a slot of slot structure 400. That is, a UE 115 may be configured with one or more SPS configurations, each of which may be associated with an offset, periodicity, downlink bandwidth, and downlink bandwidth part index (among other parameters). In some cases, the downlink bandwidth and downlink bandwidth part index may be optional.

In some cases, the one or more SPS configurations at the UE 115 may be independent of a slot format because the SPS configurations may not specify a downlink bandwidth or downlink bandwidth part index. As such, the SPS configurations may be available for each of the slots. In some cases, whether the SPS configuration is available for a slot may depend on the periodicity indicated by the SPS configuration.

If a slot (e.g., slot 1) has resources for one or multiple SPS configurations available, the UE 115 may expect to receive a PDSCH on downlink resources from the SPS opportunity or opportunities with the smallest indices or highest priorities in the slot. More particularly, the UE 115 may identify either the SPS opportunity with the highest priority (e.g., based on association with an SPS configuration with the highest priority) or the SPS opportunity with the lowest index in the slot. As illustrated in slot 1, the SPS occasion 225-b may be selected as the opportunity with the lowest index. In some examples, the SPS occasion 225 with the highest priority or lowest index, that does not have overlapping resources with the uplink resources 210 or guard resources 220. For example, if selecting among SPS opportunities with the lowest index for slot 1, the UE 115 may select SPS occasion 225-c, since SPS occasion 225-b has overlapping resources with the uplink resources 210 and guard resources 220. These techniques may be used whether or not a slot format indication is transmitted to the UE 115. For example, if the UE 115 receives a SFI indication that changes some uplink resources 210 or downlink resources 215, then the UE 115 may consider the lowest index or highest priority of SPS occasions 225 and/or whether the opportunities have overlapping resources. As will be described in further detail below, the if an SPS occasion 225-b with the overlapping resources is selected, the UE 115 may expect to receive the downlink transmission in the subset of resources of the SPS occasions 225-b that is not overlapping (e.g., the resources of the SPS occasion 225-b that are in the downlink resources 215).

In some examples, the determination of an SPS configuration for a slot may depend on a slot format of the slot. For example, each of the SPS configurations configured at the UE 115 may include an indication of a downlink bandwidth or downlink bandwidth part index. In such cases, the SPS configurations may be slot format dependent. A first SPS configuration may be applicable to a half-duplex downlink slot, such as slot 0, which has a slot format specifying downlink resources 215. Another SPS configuration may be applicable to a full-duplex slot, such as slot 2. For example, SPS configuration that specifies SPS occasion 225-a may be applicable to slot 0, since the resources are generally located in an area with uplink resources 210 and guard resources 220 as specified by the slot format of slot 1. The SPS configuration that specifies SPS occasion 225-c may be applicable to slot 1, since the SPS opportunity does not overlap with the uplink resources 210 or guard resources 220 of slot 1.

When multiple SPS configurations are available for a slot, such as indicated in slot 1, then various techniques may be used to determine the SPS resources. According to one technique, the selection of an available SPS configuration may depend on the SPS with matching resources. Thus, as illustrated in slot 1, SPS configuration corresponding to SPS occasion 225-c (or SPS occasion 225-d) may be selected, since SPS occasion 225-b overlaps with the uplink resources 210 and guard resources 220 of the slot. When multiple SPS configurations have resources that match the slot format of the slot, as illustrated by SPS occasions 225-c and 225-d, then the selection of the SPS configuration may be based on the highest priority or lowest index, as described above.

In some cases, the slot format may not match any SPS configuration. In such cases, the techniques may be: (1) this scenario is disallowed by the standards or specification; (2) the UE ignores the slot format and follows the highest priority/lowest index behavior described above; or (3) the UE 115 does not expect to receive an SPS PDSCH in the slot. In accordance with option (1), some wireless communications system may not support the case where the slot format does not match any SPS configuration. That is, either the base station 105 will not transmit SPS configurations where at least one SPS configuration is not available for a slot or where at least one SPS configuration does not specify resources that do not overlap with uplink resources 210 or guard resources 220 of the slot. Accordingly, the case where SPS occasion 225-e is the opportunity available for slot 2 may not be allowed by the wireless communications system (e.g., the base station 105 would configure at least one other SPS configuration that specifies an SPS opportunity that does not overlap with the uplink resources 210 or guard resources 220 slot 2).

However, some systems may allow cases where no SPS configurations match the slot format (e.g., have not overlapping resources), and in accordance with option (2), the UE 115 may ignore the slot format and select the SPS occasion 225 with the lowest index or highest priority in the slot. In such cases, the downlink transmission may be expected to be received in the subset of the resources of the opportunity that are not overlapping, as described above. In another example, in accordance with option (3), if the slot format does not match any of the SPS configurations, then the UE may expect to not receive a downlink transmission in the slot. These various behaviors may be configured at the UE 115 and/or may be signaled by the base station 105 (e.g., using RRC signaling).

In some cases, some SPS configurations may indicate the downlink bandwidth or downlink bandwidth part index (e.g., slot format dependent), while other SPS configurations may not indicate the downlink bandwidth or downlink bandwidth part index (e.g., not dependent on the slot formats). In such cases, the SPS configurations that do indicate the downlink bandwidth or downlink bandwidth part index may correspond to a first subset of SPS configurations, and the SPS configurations that do not indicate the downlink bandwidth or downlink bandwidth part index may correspond to a second subset of SPS configurations. In accordance with a first technique, the UE 115 may consider whether the SPS configurations of the first subset of SPS configurations that match the slot format, as described above, to determine which SPS configuration to use for receiving downlink communications. If multiple SPS configurations of the first subset match a slot format, then the UE 115 may select the SPS configuration having the SPS occasion 225 with the highest priority or lowest index, as described above. Further, if none of the SPS configurations of the first subset match the slot formats, then the UE 115 may select the SPS configuration of either the first subset, or both the first and second subset, that has the SPS occasion 225 with the highest priority or lowest index for the slot.

In accordance with another technique, when the SPS configurations are mixed in that either the configurations do or do not indicate the downlink bandwidth or downlink bandwidth part index, as described above, then the UE 115 may consider the SPS configuration with the lowest index/highest priority of the second subset, as specified above. Thus, the SPS configurations that indicate the downlink bandwidth or downlink bandwidth part index may be ignored. In accordance with another technique, the UE 115 may consider the SPS configuration with the highest priority or lowest index of both the first subset and the second subset (e.g., the available SPS configurations while ignoring the slot format). The behavior of the UE 115 when the SPS configurations are mixed may be configured via RRC, MAC-CE, or downlink control information (DCI) signaling.

The techniques described with respect to FIGS. 3 and 4 may be applicable when multiple SPS configurations may or may not be overlapping in slots. An overlapping SPS occasion may occur by configuration or when the UE 115 receives an slot format indication (SFI) that switches a downlink slot (e.g., a half-duplex slot) into a full-duplex slot (e.g., a SBFD slot). In accordance with these techniques, the UE 115 and the base station 105 may determine one or more SPS configurations for a slot and monitor an SPS occasion 225 for receipt of a downlink communication.

Figure 5:
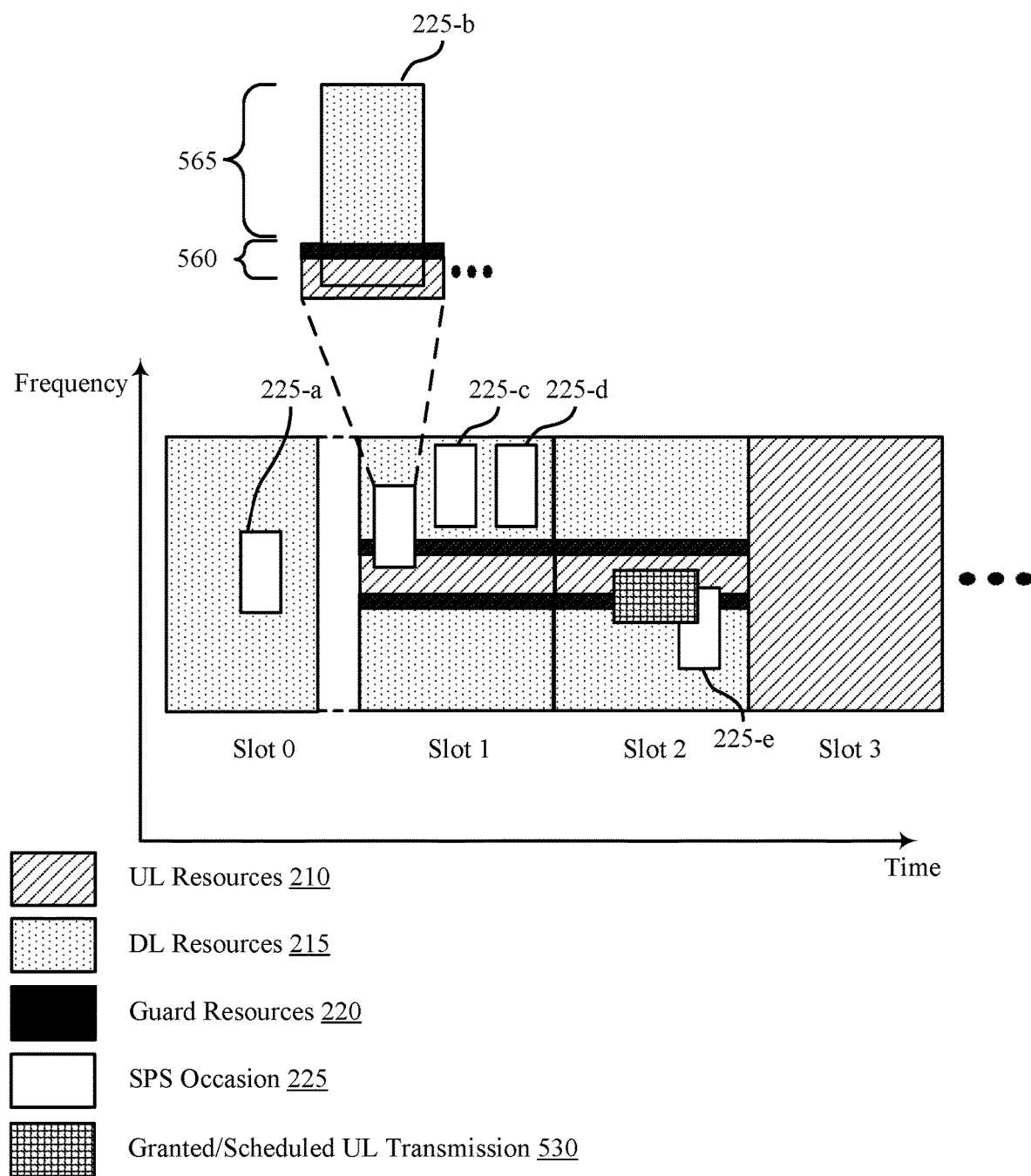
FIG. 5 illustrates an example of a slot structure that supports semi-persistent scheduling for subband full-duplex slots in accordance with aspects of the present disclosure.

FIG. 5 illustrates an example of a slot structure 500 that supports semi-persistent scheduling for subband full-duplex slots in accordance with aspects of the present disclosure. In some examples, slot structure 500 may implement aspects of wireless communications system 100. The slot structure 500 may be implemented by a UE 115 and a base station 105 as described with respect to FIGS. 1 through 4. Each slot includes an allocation of resources which may be referred to as a slot structure. For example, slot 0 includes a slot structure specifying downlink resources 215 (e.g., a half-duplex slot). Slots 1 and 2 may be examples of SBFD slots that include a slot structure specifying both uplink resources 210 and downlink resources 215. The uplink resources 210 and downlink resources 215 may be separated by guard resources 220. Slot 3 includes a slot structure specifying uplink resources 210 (e.g., a half-duplex slot).

SPS configurations (e.g., SPS configurations 250 of FIG. 2) may be transmitted to a UE 115, and the SPS configurations may allocate SPS occasions 225 that may be applicable to a slot of slot structure 500. That is, a UE 115 may be configured with one or more SPS configurations, each of which may be associated with an offset, periodicity, downlink bandwidth, and downlink bandwidth part index (among other parameters). In some cases, the downlink bandwidth and downlink bandwidth part index may be optional.

In some cases, an SPS occasion 225 may overlap with uplink resources 210 or guard resources 220, or both, as illustrated by SPS occasion 225-b. Various techniques of handling overlapping SPS occasions are described with respect to FIG. 5. SPS occasion 225-b may overlap with the dynamically granted uplink resources 210, which may be configured via SFI or another grant technique. In some examples, the UE 115 may identify an error condition when this occurs. However, when there are multiple SPS occasions 225, as illustrated with respect to slot 1, then, the UE 115 may skip SPS opportunities with overlapping resources. That is, the UE 115 may assume that the SPS PDSCH (e.g., downlink communication) is transmitted using the resources of the SPS opportunity with the smallest index (or highest priority) among the remaining SPS occasions 225 (that does not have overlapping resources). Thus, as illustrated in slot 1, the UE 115 may assume that the SPS PDSCH is not transmitted using resources of SPS occasion 225-b, and the SPS PDSCH is transmitted using resources of the SPS occasion 225-c. These techniques may be applicable when an SPS occasion 225 overlaps with guard resources 220, uplink resources 210, or both.

However, in accordance with some techniques, it is determined that the SPS PDSCH transmission is to be transmitted using resources of the SPS opportunity with overlapping resources (e.g., SPS occasion 225-b). In such cases, the downlink transmission (e.g., SPS PDSCH) may be transmitted in a subset of the resources of SPS occasion 225-b that do not overlap with the uplink resources 210 or guard resources 220. In some examples, some or all of the SPS configurations may be configured to use an SPS occasion 225 that overlaps with guard resources 220 and/or the uplink resources 210. The SPS indication (e.g., SPS configuration 250 of FIG. 2) may use a dedicated field to signal that the SPS configuration is allowed to use the uplink/guard resources. In some cases, the field includes a bit indication. In other cases, an existing priority flag may indicate that the SPS configuration may use uplink/guard resources.

When an SPS occasion 225 that overlaps with uplink/guard resources is used, then various techniques may be used to transmit the SPS PDSCH. Generally, a subset 565 of the resources that does not overlap with the uplink or guard resources is used to transmit the PDSCH. That is, the SPS PDSCH is not transmitted in a subset 560 of the resources that overlaps with the uplink/guard resources, and is transmitted using the downlink resources 215 of the SPS occasion 225-b. The base station 105 may perform one or more of these techniques to transmit the PDSCH in the subset 565 of non-overlapping resources. In one example, the base station 105 uses rate matching to fill the downlink SPS resources with coded bits. That is, the subset 565 of non-overlapping resources may be rate-matched around the subset 560 of overlapping resources.

In accordance with another technique, the base station 105 may use puncturing such that coded bits assigned to resource blocks outside the downlink region are not transmitted (e.g., resources blocks in the subset 560 of resources). In accordance with another technique, the base station 105 may increase the rank associated with the downlink transmission such that the resources needed to transmit the downlink transmission are reduced. In such cases, the UE 115 may be configured with a default rank and a maximum or higher rank. The UE 115 may perform blind decoding on the subset 565 of resources using each rank to decode the downlink transmission. Similarly, in accordance with yet another technique, the downlink transmission may use an increased MCS (e.g., coding rate). In such cases, the UE 115 may be configured with a default MCS and a maximum or higher MCS, and the UE 115 may perform blind decoding on the subset 565 of downlink resources using the default MCS and the maximum/higher MCS. Similarly, rather than increasing the MCS, the modulation order may be increased. In such cases the UE 115 may use the default modulation order and the higher modulation order to perform blind decoding. The UE 115 may be configured with these behaviors using RRC, MAC-CE, or DCI activation signaling for reconfiguration. That is, such signaling may be used to transmit default and higher ranks, MCSs, modulation orders, etc.

In some cases, an SPS occasion 225-e may overlap with resources of a granted or scheduled uplink transmission 530. The uplink transmission may be an example of a dynamically granted PUSCH, PUCCH, aperiodic sounding reference signal (SRS), etc. For example, the UE 115 may receive a configured grant indication scheduling a PUSCH as the uplink transmission 530. As illustrated, the uplink transmission 530 may overlap with guard resources 220 or downlink resources 215. In some examples, the wireless communications system (e.g., wireless communications system 100) may not allow for this scenario to occur. That is, the base station 105 may not schedule resources such that resources of an uplink transmission 530 and an SPS occasion 225-e overlap. In another handling technique, the non-collided downlink resources of the SPS occasion 225-e may be used for the downlink transmission. In such cases, the downlink transmission may be rate-matched, encoded with an increased rank, MCS, modulation order, etc., and the collided resources punctured, as described above.

In accordance with another technique when an SPS occasion 225 collides with an uplink transmission 530, either the SPS occasion 225 or the uplink transmission is skipped based on a priority associated with each. Thus, either the SPS occasion 225-e is monitored or the uplink transmission 530 is transmitted in accordance with the one with the highest priority. If the priorities associated with both are the same, then both resources may be skipped, or the non-collided downlink resources may be used, as described above. In another example, if both resources have the same priority, then the devices may select one or the other of the uplink transmission 530 or the SPS occasion 225-e in accordance with a configuration received from the base station 105 (e.g., RRC-configured, MAC-CE update, or DCI configuration). These techniques may apply whether the uplink transmission 530 is an configured grant PUSCH, dynamically granted PUSCH, a PUCCH, or aperiodic SRS.

Figure 6:
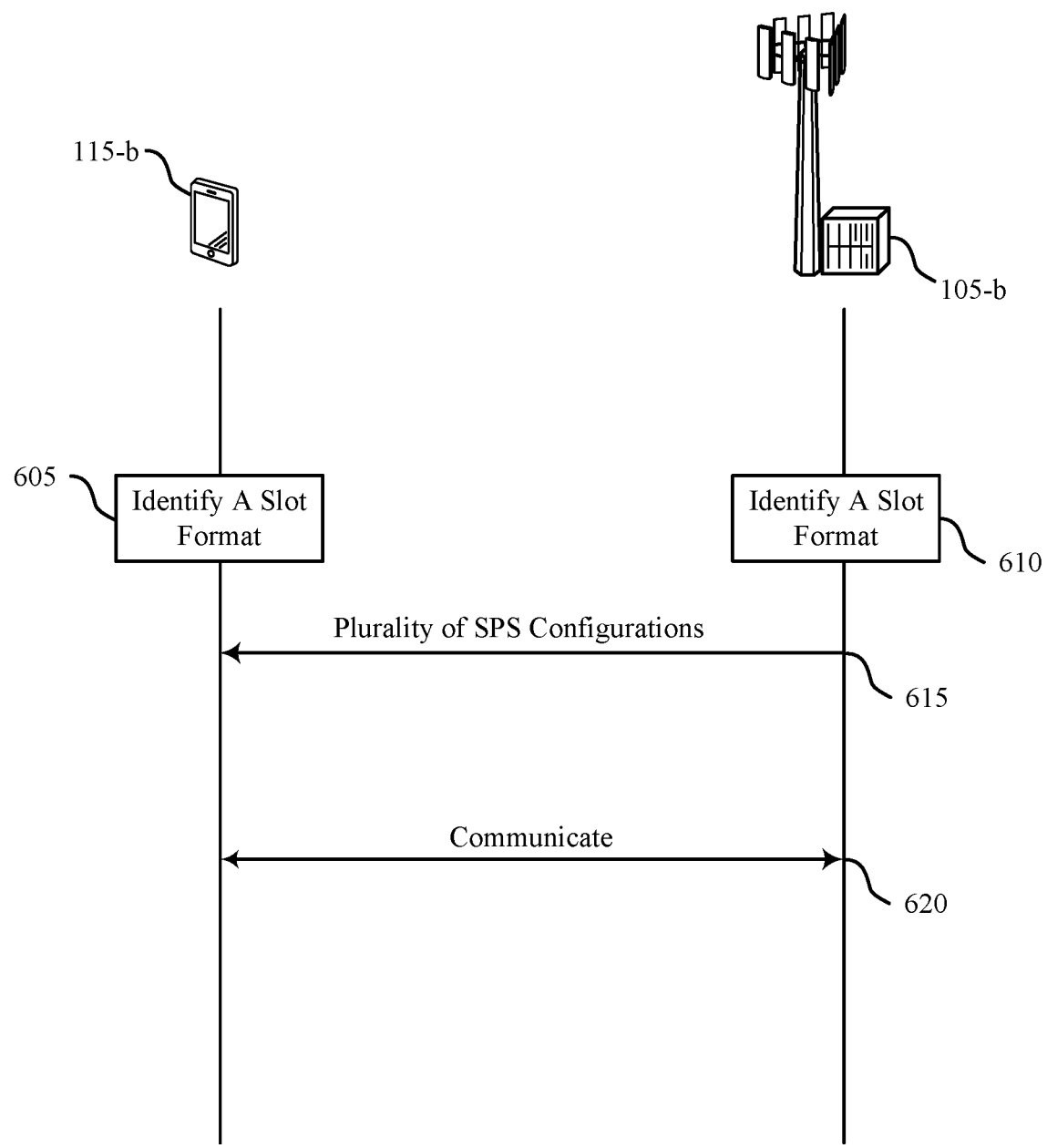
FIG. 6 illustrates an example of a process flow diagram that supports semi-persistent scheduling for subband full-duplex slots in accordance with aspects of the present disclosure.

FIG. 6 illustrates an example of a process flow diagram 600 that supports semi-persistent scheduling for subband full-duplex slots in accordance with aspects of the present disclosure. In some examples, process flow diagram 600 may implement aspects of wireless communications system 100. The process flow diagram may include a UE 115-b and a base station 105-b, which may be examples of the corresponding devices of FIGS. 1 and 2.

At 605, the UE 115-b, may identify a slot format for each slot of a first plurality of slots. A pattern of slot formats for the first plurality of slots is repeated in subsequent pluralities of slots, and the slot format for at least one slot of the first plurality of slots specifies uplink resources and downlink resources separated in a frequency domain. The at least one slot may be an example of an SBFD slot. At 610, the base station 105-b identifies a slot format for each slot of the first plurality of slots.

At 615, the base station 105-b may transmit, to the UE 115-b, a plurality of semi-persistent scheduling configurations for receiving downlink transmissions from the base station. Each of the plurality of semi-persistent scheduling configurations may be configured for one or more of the first plurality of slots and for corresponding slots of the subsequent pluralities of slots based at least in part on the slot format of each of the first plurality of slots. In some examples, the SPS configurations are applied to each of the first plurality and subsequent plurality of slots based at least in part on periodicity value associated with the number of slots. In some cases, an SPS configuration may be configured for more than one slot that share a same slot format.

At 620, the UE 115-b and the base station 105-b may communicate based at least in part on the plurality of semi-persistent scheduling configurations. The communication may include receipt, by the UE 115-b of a downlink shared channel transmission in an SPS occasion identified by one of the plurality of SPS configurations in a slot.

Figure 7:
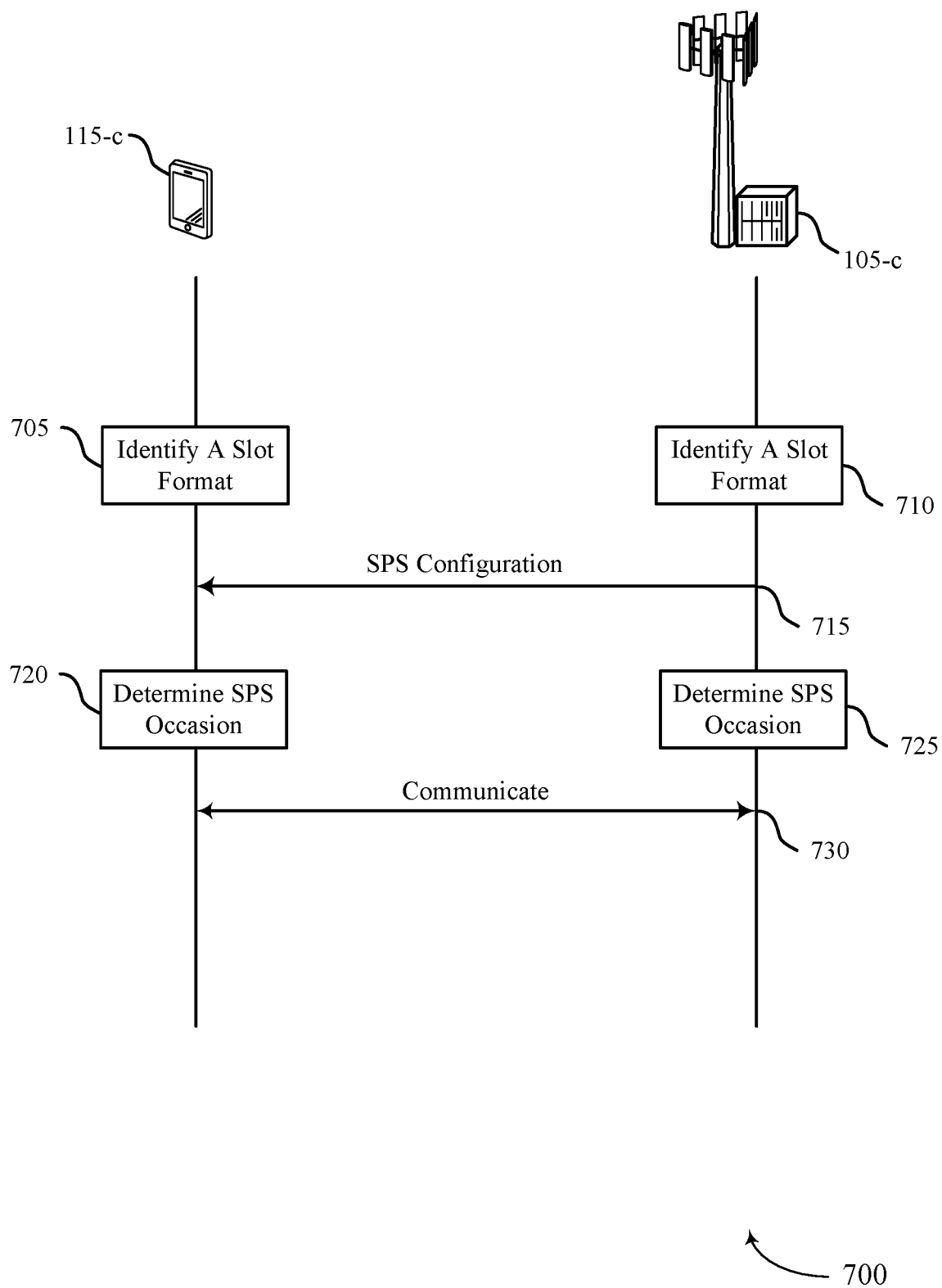
FIG. 7 illustrates an example of a process flow diagram that supports semi-persistent scheduling for subband full-duplex slots in accordance with aspects of the present disclosure.

FIG. 7 illustrates an example of a process flow diagram 700 that supports semi-persistent scheduling for subband full-duplex slots in accordance with aspects of the present disclosure. In some examples, process flow diagram 700 may implement aspects of wireless communications system 100. The process flow diagram 700 includes a UE 115-c and a base station 105-c, which may be examples of the corresponding devices of FIGS. 1, 2, and 6.

At 705, the UE may identify a slot format for a slot of a plurality of slots, wherein the slot format for the slot specifies uplink resources and downlink resources separated in a frequency domain. At 710, the base station 105-c may identify the slot format for the slot of the plurality of slots.

At 715, the base station 105-c may transmit, to the UE 115-c, at least one semi-persistent scheduling configuration for receiving downlink transmissions from the base station.

At 720, the UE 115-c may determine, for the slot of the plurality of slots, one or more semi-persistent scheduling occasions for receipt of at least one downlink shared channel transmission based at least in part on the slot format of the slot and the at least one semi-persistent scheduling configuration. At 725, the base station 105-c may determine, for the slot of the plurality of slots, one or more semi-persistent scheduling occasions for transmission of at least one downlink shared channel transmission based at least in part on the slot format of the slot and the at least one semi-persistent scheduling configuration. The occasions may be determined based on whether the SPS configurations match the slot format, whether the configurations indicate a downlink bandwidth or bandwidth part index, highest priorities or lowest index, whether the occasions are overlapping with uplink resources, uplink transmissions, etc., as described herein.

At 730, the UE 115-c and the base station 105-c may communicate based at least in part on determining the semi-persistent scheduling occasions for the slot. The communication may include transmission, by the base station 105-c, of a physical downlink shared channel transmission in one of the SPS occasions. In some cases, the downlink shared channel transmission is transmitted in a subset of downlink resources of an SPS occasion that overlaps with the uplink or guard resources of the slot or resources of an uplink transmission. In such cases, the downlink transmission may be punctured or encoded based on the SPS occasion overlapping, as described herein.

Figure 8:
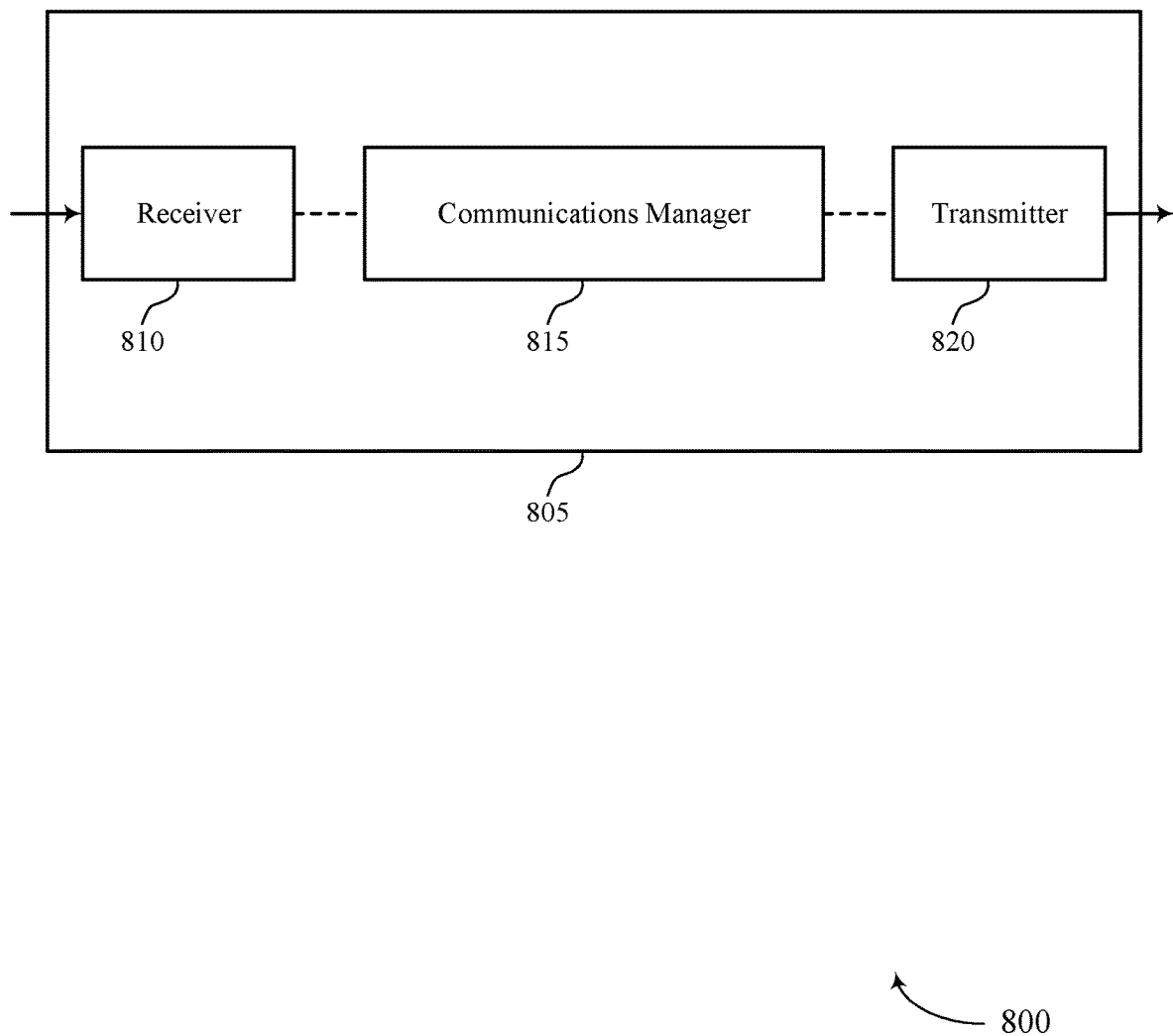
FIGS. 8 and 9 show block diagrams of devices that support semi-persistent scheduling for subband full-duplex slots in accordance with aspects of the present disclosure.

FIG. 8 shows a block diagram 800 of a device 805 that supports semi-persistent scheduling for subband full-duplex slots in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to semi-persistent scheduling for subband full-duplex slots, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, receive, from a base station, a set of semi-persistent scheduling configurations for receiving downlink transmissions from the base station, where each of the set of semi-persistent scheduling configurations is configured for one or more of the first set of slots and for corresponding slots of the subsequent pluralities of slots based on the slot format of each of the first set of slots, and communicate with the base station based on the set of semi-persistent scheduling configurations. The communications manager 815 may also identify a slot format for a slot of a set of slots, where the slot format for the slot specifies uplink resources and downlink resources separated in a frequency domain, receive, from a base station, at least one semi-persistent scheduling configuration for receiving downlink transmissions from the base station, determine, for the slot of the set of slots, one or more semi-persistent scheduling occasions for receipt of at least one downlink shared channel transmission based on the slot format of the slot and the at least one semi-persistent scheduling configuration, and communicate with the base station based on determining the semi-persistent scheduling occasions for the slot. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
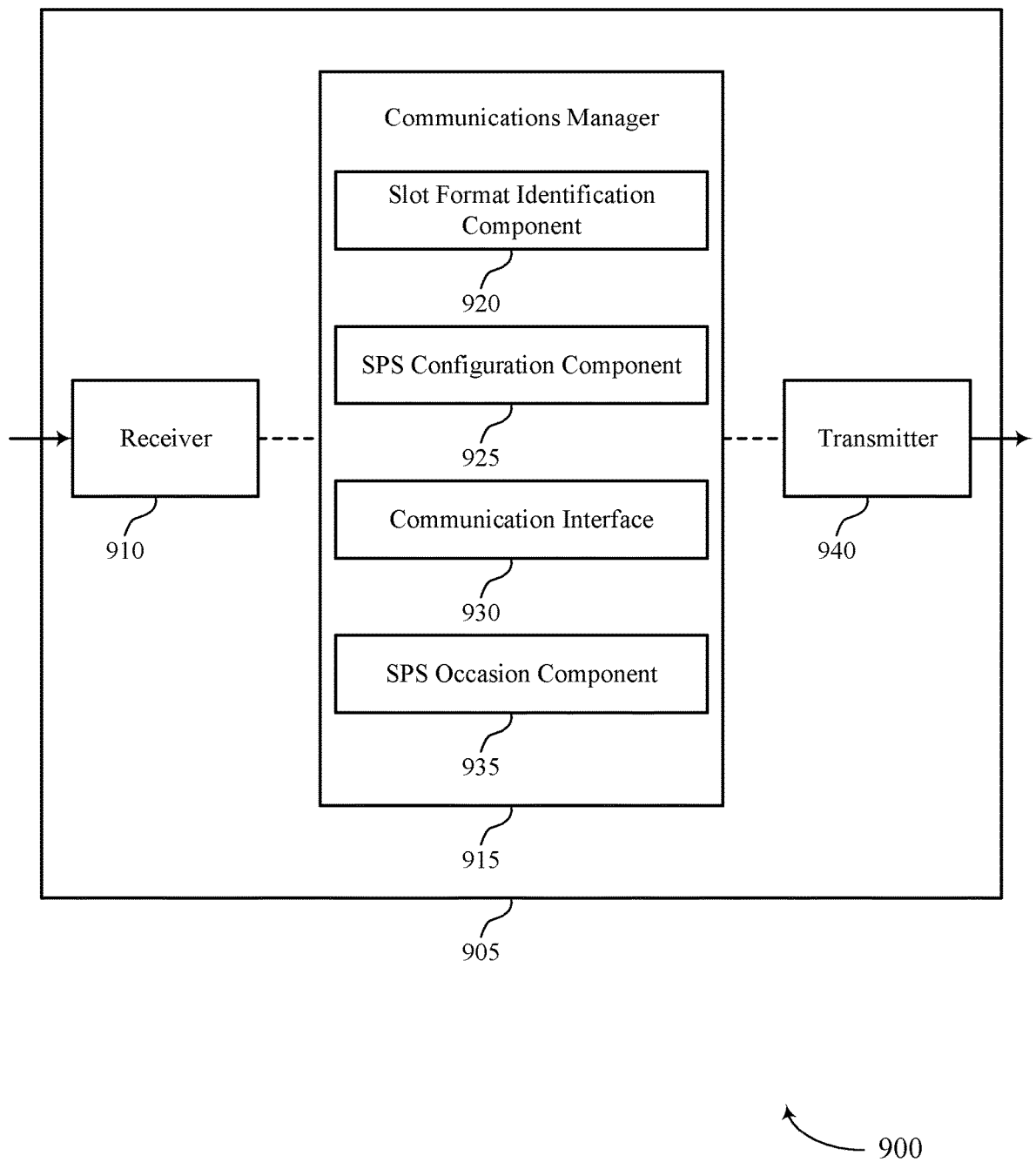

FIG. 9 shows a block diagram 900 of a device 905 that supports semi-persistent scheduling for subband full-duplex slots in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to semi-persistent scheduling for subband full-duplex slots, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a slot format identification component 920, an SPS configuration component 925, a communication interface 930, and an SPS occasion component 935. The communications manager 915 may be an example of aspects of the communications manager 1110 described herein.

The slot format identification component 920 may identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain.

The SPS configuration component 925 may receive, from a base station, a set of semi-persistent scheduling configurations for receiving downlink transmissions from the base station, where each of the set of semi-persistent scheduling configurations is configured for one or more of the first set of slots and for corresponding slots of the subsequent pluralities of slots based on the slot format of each of the first set of slots.

The communication interface 930 may communicate with the base station based on the set of semi-persistent scheduling configurations.

The slot format identification component 920 may identify a slot format for a slot of a set of slots, where the slot format for the slot specifies uplink resources and downlink resources separated in a frequency domain.

The SPS configuration component 925 may receive, from a base station, at least one semi-persistent scheduling configuration for receiving downlink transmissions from the base station.

The SPS occasion component 935 may determine, for the slot of the set of slots, one or more semi-persistent scheduling occasions for receipt of at least one downlink shared channel transmission based on the slot format of the slot and the at least one semi-persistent scheduling configuration.

The communication interface 930 may communicate with the base station based on determining the semi-persistent scheduling occasions for the slot.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
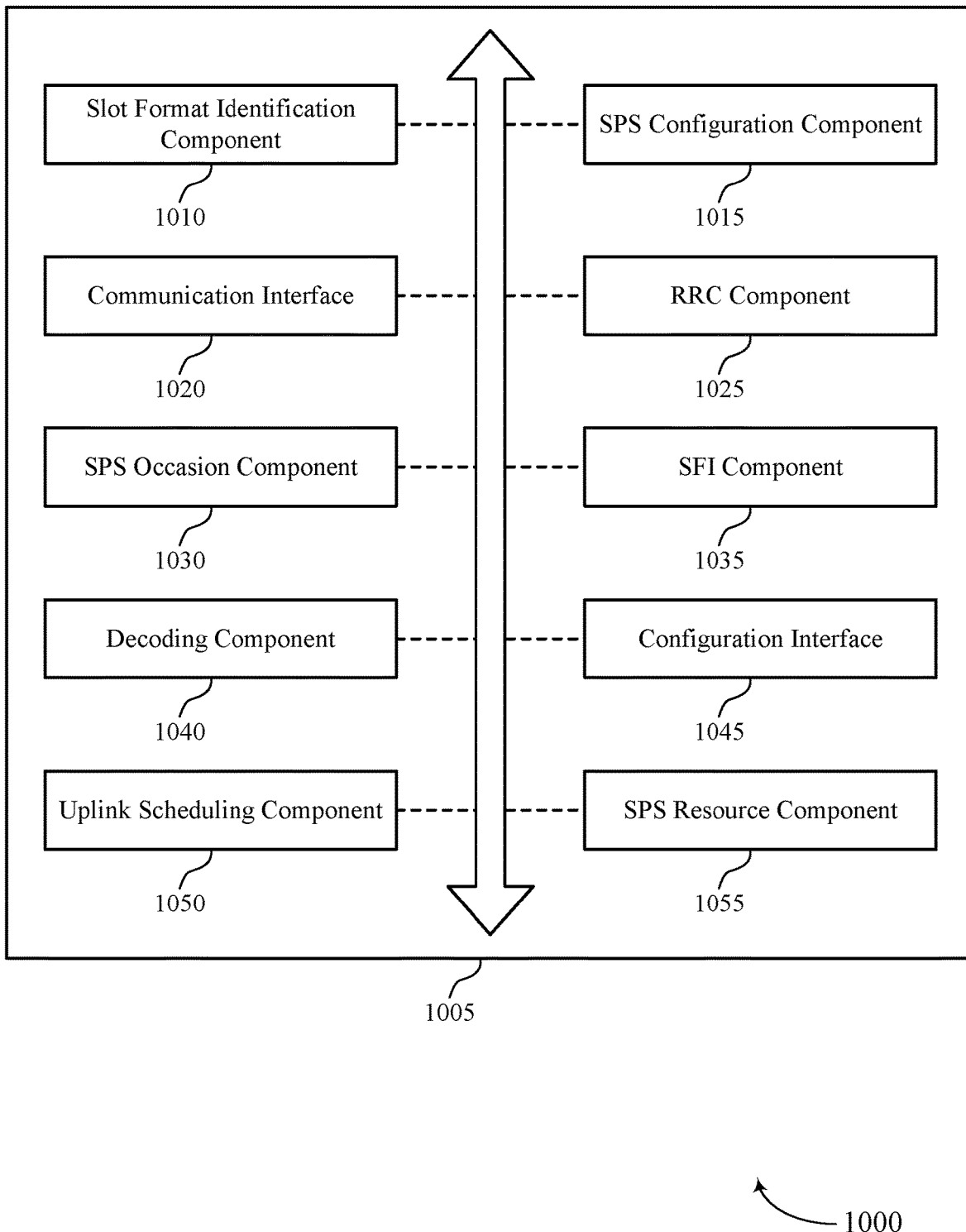
FIG. 10 shows a block diagram of a communications manager that supports semi-persistent scheduling for subband full-duplex slots in accordance with aspects of the present disclosure.

FIG. 10 shows a block diagram 1000 of a communications manager 1005 that supports semi-persistent scheduling for subband full-duplex slots in accordance with aspects of the present disclosure. The communications manager 1005 may be an example of aspects of a communications manager 815, a communications manager 915, or a communications manager 1110 described herein. The communications manager 1005 may include a slot format identification component 1010, an SPS configuration component 1015, a communication interface 1020, a RRC component 1025, an SPS occasion component 1030, a SFI component 1035, a decoding component 1040, a configuration interface 1045, an uplink scheduling component 1050, and an SPS resource component 1055. Each of these modules may communicate, directly or indirectly, with one another (e.g., via one or more buses).

The slot format identification component 1010 may identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain.

In some examples, the slot format identification component 1010 may identify a slot format for a slot of a set of slots, where the slot format for the slot specifies uplink resources and downlink resources separated in a frequency domain.

The SPS configuration component 1015 may receive, from a base station, a set of semi-persistent scheduling configurations for receiving downlink transmissions from the base station, where each of the set of semi-persistent scheduling configurations is configured for one or more of the first set of slots and for corresponding slots of the subsequent pluralities of slots based on the slot format of each of the first set of slots.

In some examples, the SPS configuration component 1015 may receive, from a base station, at least one semi-persistent scheduling configuration for receiving downlink transmissions from the base station.

In some examples, the SPS configuration component 1015 may receive a periodicity value such that each of the set of semi-persistent scheduling configurations is configured for the one or more of the first set of slots and for corresponding slots of the subsequent pluralities of slots based on the periodicity value.

In some examples, the SPS configuration component 1015 may receive a first semi-persistent scheduling configuration of the set of semi-persistent scheduling configurations that is configured for more than one slot of the first set of slots and for corresponding slots of the subsequent pluralities of slots, where the more than one slot each share a same slot format.

In some examples, the SPS configuration component 1015 may select one or more of the at least one semi-persistent scheduling configuration for receiving the downlink transmissions for the slot based on a highest priority of the at least one semi-persistent scheduling configuration or a lowest index of the at least one semi-persistent scheduling configuration.

In some examples, the SPS configuration component 1015 may determine that a set of semi-persistent scheduling configurations are each configured for a respective slot format.

In some examples, the SPS configuration component 1015 may determine that a subset of the set of semi-persistent scheduling configurations are configured for respective slot formats that match the slot format of the slot.

In some examples, the SPS configuration component 1015 may select one of the subset of semi-persistent scheduling configurations for receipt of the at least one downlink shared channel transmission during the slot based on a highest priority or a lowest index of the subset of semi-persistent scheduling configurations.

In some examples, the SPS configuration component 1015 may determine that none of the set of semi-persistent scheduling configurations are configured for respective slot formats that match the slot format of the slot.

In some examples, the SPS configuration component 1015 may select one of the subset of semi-persistent scheduling configurations for receipt of the at least one downlink shared channel transmission during the slot based on a highest priority or a lowest index of the subset of semi-persistent scheduling configurations in accordance with determining that none of the set of semi-persistent scheduling configurations are configured for respective slot formats that match the slot format of the slot.

In some examples, the SPS configuration component 1015 may determine that the UE is not to receive the downlink transmissions in the first slot based on determining that none of the set of semi-persistent scheduling configurations are configured for respective slot formats that match the slot format of the slot.

In some examples, the SPS configuration component 1015 may identify that each of the at least one semi-persistent scheduling configuration includes an indication of a downlink bandwidth, a downlink bandwidth part index, or both, where determining the semi-persistent scheduling configuration that is configured for each slot is further based on each of the at least one semi-persistent scheduling configuration including the indication of the downlink bandwidth, the downlink bandwidth part index, or both.

In some examples, the SPS configuration component 1015 may determine that a first subset of semi-persistent scheduling configurations of the at least one semi-persistent scheduling configuration are each configured for a respective slot format.

In some examples, the SPS configuration component 1015 may determine that a second subset of semi-persistent scheduling configurations of the at least one semi-persistent scheduling configuration are not included in the first subset of semi-persistent scheduling configurations.

In some examples, the SPS configuration component 1015 may determine that one or more of the first subset of semi-persistent scheduling configurations are configured for respective slot formats that match the slot format of the slot.

In some examples, the SPS configuration component 1015 may select a semi-persistent scheduling configuration of the second subset for each slot based on a highest priority or a lowest index of semi-persistent scheduling configurations of the second subset.

In some examples, the SPS configuration component 1015 may select a semi-persistent scheduling configuration of the first subset and the second subset for each slot of the set of slots based on a highest priority or a lowest index of semi-persistent scheduling configurations of the first subset and the second subset.

In some examples, the SPS configuration component 1015 may determine that a semi-persistent scheduling occasion for receipt of the at least one downlink shared channel transmission at least partially overlaps with the uplink resources or guard resources of the slot based on determining the downlink resources.

In some examples, the SPS configuration component 1015 may identify an error condition based on the semi-persistent scheduling occasion at least partially overlapping with the uplink resources or the guard resources.

In some examples, the SPS configuration component 1015 may determine a semi-persistent scheduling occasion of the semi-persistent scheduling occasions in the slot for receipt of the at least one downlink shared channel transmission based on a smallest index or highest priority of the semi-persistent scheduling occasions that does not include resources that overlap with the uplink resources or the guard resources of the slot.

In some examples, the SPS configuration component 1015 may identify that the at least one semi-persistent scheduling configuration includes an indication that semi-persistent scheduling occasions associated with the at least one semi-persistent scheduling configuration are available for receipt of the at least one downlink shared channel transmission notwithstanding partial overlap with the uplink resources or the guard resources.

In some cases, the periodicity value specifies a value n number of slots such that a particular semi-persistent scheduling configuration of the set of semi-persistent scheduling configurations is configured for the nth slot in the first set of slots and the nth slot in the subsequent pluralities of slots.

In some cases, each of the set of semi-persistent scheduling configurations indicates a timing offset corresponding to a first subframe of a respective slot, duration of time-domain resources of the respective slot, frequency domain resources of the respective slot, or a combination thereof.

In some cases, the at least one semi-persistent scheduling configuration is not associated with a downlink bandwidth or a downlink bandwidth part index.

The communication interface 1020 may communicate with the base station based on the set of semi-persistent scheduling configurations.

In some examples, the communication interface 1020 may communicate with the base station based on determining the semi-persistent scheduling occasions for the slot.

In some examples, the communication interface 1020 may receive the downlink transmissions from the base station in downlink resources of the first set of slots allocated based on the set of semi-persistent scheduling configurations.

In some examples, the communication interface 1020 may refrain from monitoring the semi-persistent scheduling occasion for receipt of the at least one downlink shared channel transmission based on the semi-persistent scheduling occasion at least partially overlapping with the uplink resources or the guard resources.

In some examples, the communication interface 1020 may monitor a different semi-persistent scheduling occasion associated with a different semi-persistent scheduling configuration, where the different semi-persistent scheduling occasion does not overlap with the uplink resources or guard resources of the slot.

In some examples, the communication interface 1020 may receive, from the base station, the at least one downlink shared channel transmission in downlink resources of the semi-persistent scheduling occasion including the resources that overlap with the uplink resources or the guard resources of the slot.

In some examples, the communication interface 1020 may monitor for the at least one downlink shared channel transmission in a subset of the resources of the one or more semi-persistent scheduling occasions that do not overlap with the resources allocated by the uplink grant.

In some examples, the communication interface 1020 may determine to monitor for the at least one downlink shared channel transmission or to transmit the one or more uplink transmissions based on a first priority associated with the one or more semi-persistent scheduling occasions and a second priority associated with the uplink grant.

In some examples, the communication interface 1020 may determine to not monitor for the at least one downlink shared channel transmission and to not transmit the one or more uplink transmissions based on a first priority associated with the one or more semi-persistent scheduling occasions and a second priority associated with the uplink grant being a same priority.

In some cases, at least one downlink transmission is received in at least a portion of the downlink resources of the at least one slot.

In some cases, the at least one downlink shared channel transmission is received via coded bits on resources that are rate-matched around the resources that overlap.

In some cases, the at least one downlink shared channel transmission is punctured by the resources that overlap.

In some cases, the determining to monitor for the at least one downlink shared channel transmission or to transmit the one or more uplink transmissions is further based on a configuration received from the base station.

The SPS occasion component 1030 may determine, for the slot of the set of slots, one or more semi-persistent scheduling occasions for receipt of at least one downlink shared channel transmission based on the slot format of the slot and the at least one semi-persistent scheduling configuration.

In some examples, the SPS occasion component 1030 may determine that a semi-persistent scheduling occasion for receiving the downlink shared channel transmission allocated by the at least one semi-persistent scheduling configuration overlaps with the uplink resources for the slot or guard resources for the slot.

In some examples, the SPS occasion component 1030 may determine the downlink transmissions for the slot are to be received in the resources of the semi-persistent scheduling occasion that are not overlapping with the uplink resources for the slot or the guard resources for the slot.

The RRC component 1025 may receive a radio resource control signal indicating the set of semi-persistent scheduling configurations.

The SFI component 1035 may receive, from the base station, a slot format indication that allocates at least a portion of the uplink resources for the slot.

In some examples, the SFI component 1035 may receive, from the base station, a slot format indication that indicates the slot format of the slot.

The decoding component 1040 may perform blind decoding on the downlink resources of the semi-persistent scheduling occasion based on at least one rank configured at the UE.

In some examples, the decoding component 1040 may decode the at least one downlink shared channel transmission using at least one modulation and coding scheme configured at the UE.

In some examples, the decoding component 1040 may decode the at least one downlink shared channel transmission using at least one modulation order configured at the UE.

In some cases, the downlink shared channel transmission is decoded in accordance with a second rank that is higher than a first rank based on performing the blind decoding.

In some cases, the downlink shared channel transmission is decoded in accordance with a second modulation and coding scheme that is higher than a first modulation and coding scheme.

In some cases, the downlink shared channel transmission is decoded in accordance with a second modulation order that is higher than a first modulation order.

The configuration interface 1045 may receive, via radio resource control signaling, medium access control element signaling, or downlink control information signaling, an indication of a rate matching configuration, a puncturing configuration, a rank configuration, a modulation and coding scheme configuration, a modulation order configuration, or a combination thereof.

In some cases, the at least one downlink shared channel transmission is received in accordance with the indication.

The uplink scheduling component 1050 may receive, from the base station, an uplink grant that allocates resources of the slot for one or more uplink transmissions.

In some cases, the one or more uplink transmissions include an uplink shared channel transmission, an uplink control channel transmission, a sounding reference signal transmission, or a combination thereof.

In some cases, the uplink grant includes a configured grant.

The SPS resource component 1055 may determine that the one or more semi-persistent scheduling occasions overlaps with the resources allocated by the uplink grant.

Figure 11:
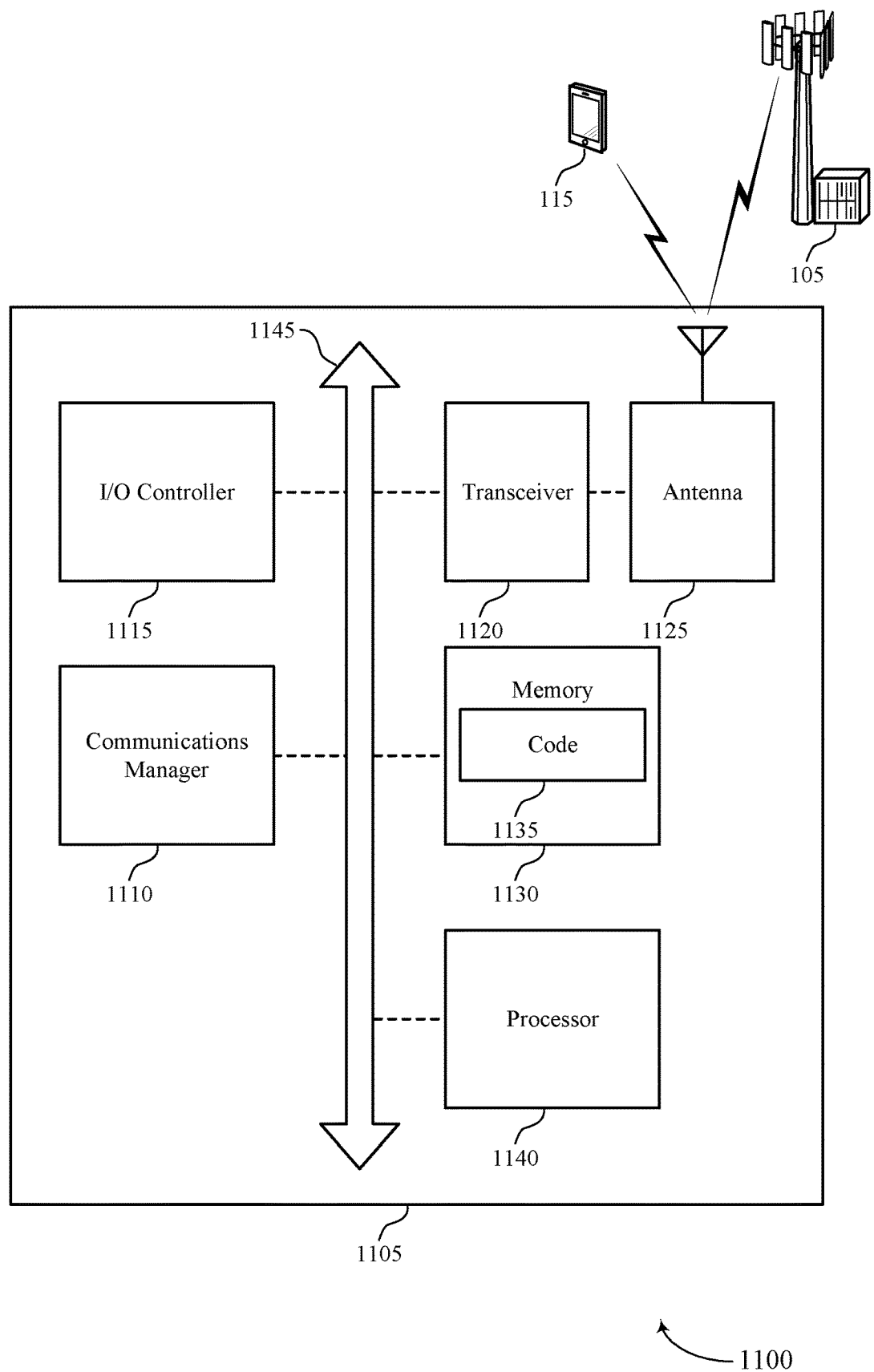
FIG. 11 shows a diagram of a system including a device that supports semi-persistent scheduling for subband full-duplex slots in accordance with aspects of the present disclosure.

FIG. 11 shows a diagram of a system 1100 including a device 1105 that supports semi-persistent scheduling for subband full-duplex slots in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, receive, from a base station, a set of semi-persistent scheduling configurations for receiving downlink transmissions from the base station, where each of the set of semi-persistent scheduling configurations is configured for one or more of the first set of slots and for corresponding slots of the subsequent pluralities of slots based on the slot format of each of the first set of slots, and communicate with the base station based on the set of semi-persistent scheduling configurations. The communications manager 1110 may also identify a slot format for a slot of a set of slots, where the slot format for the slot specifies uplink resources and downlink resources separated in a frequency domain, receive, from a base station, at least one semi-persistent scheduling configuration for receiving downlink transmissions from the base station, determine, for the slot of the set of slots, one or more semi-persistent scheduling occasions for receipt of at least one downlink shared channel transmission based on the slot format of the slot and the at least one semi-persistent scheduling configuration, and communicate with the base station based on determining the semi-persistent scheduling occasions for the slot.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting semi-persistent scheduling for subband full-duplex slots).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
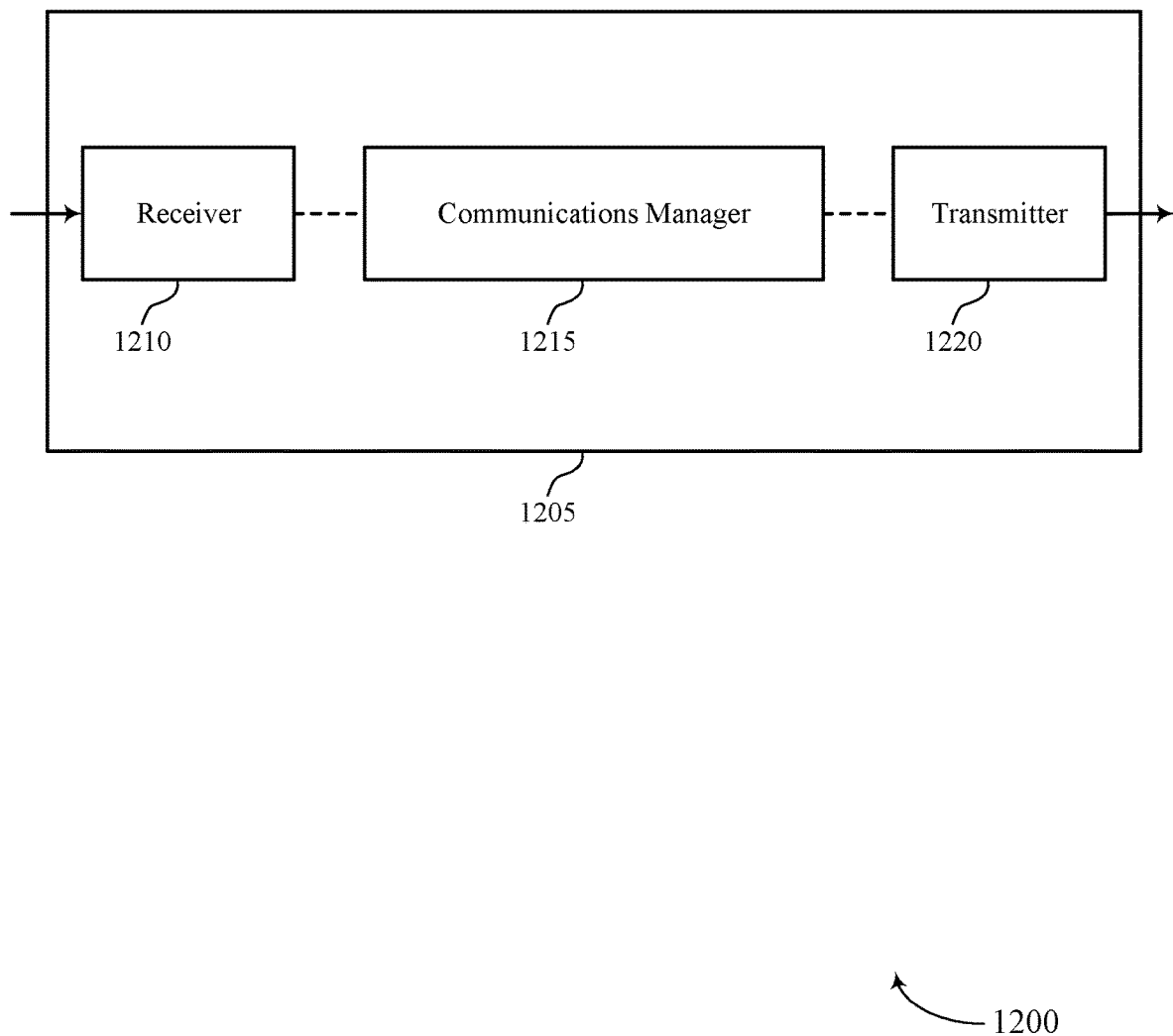
FIGS. 12 and 13 show block diagrams of devices that support semi-persistent scheduling for subband full-duplex slots in accordance with aspects of the present disclosure.

FIG. 12 shows a block diagram 1200 of a device 1205 that supports semi-persistent scheduling for subband full-duplex slots in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to semi-persistent scheduling for subband full-duplex slots, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, transmit, to a UE, a set of semi-persistent scheduling configurations for receiving, by the UE, downlink transmissions from the base station, where each of the set of semi-persistent scheduling configurations is configured for one or more of the first set of slots and for corresponding slots of the subsequent pluralities of slots based on the slot format of each of the first set of slot, and communicate with the UE based on the set of semi-persistent scheduling configurations. The communications manager 1215 may also identify a slot format for a slot of a set of slots, where the slot format for the slot specifies uplink resources and downlink resources separated in a frequency domain, transmit, to a UE, at least one semi-persistent scheduling configuration for receiving, by the UE, downlink transmissions from the base station, determine, for the slot of the set of slots, one or more semi-persistent scheduling occasions for transmission of at least one downlink shared channel transmission based on the slot format of the slot and the at least one semi-persistent scheduling configuration, and communicate with the UE based on determining the semi-persistent scheduling occasions for the slot. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
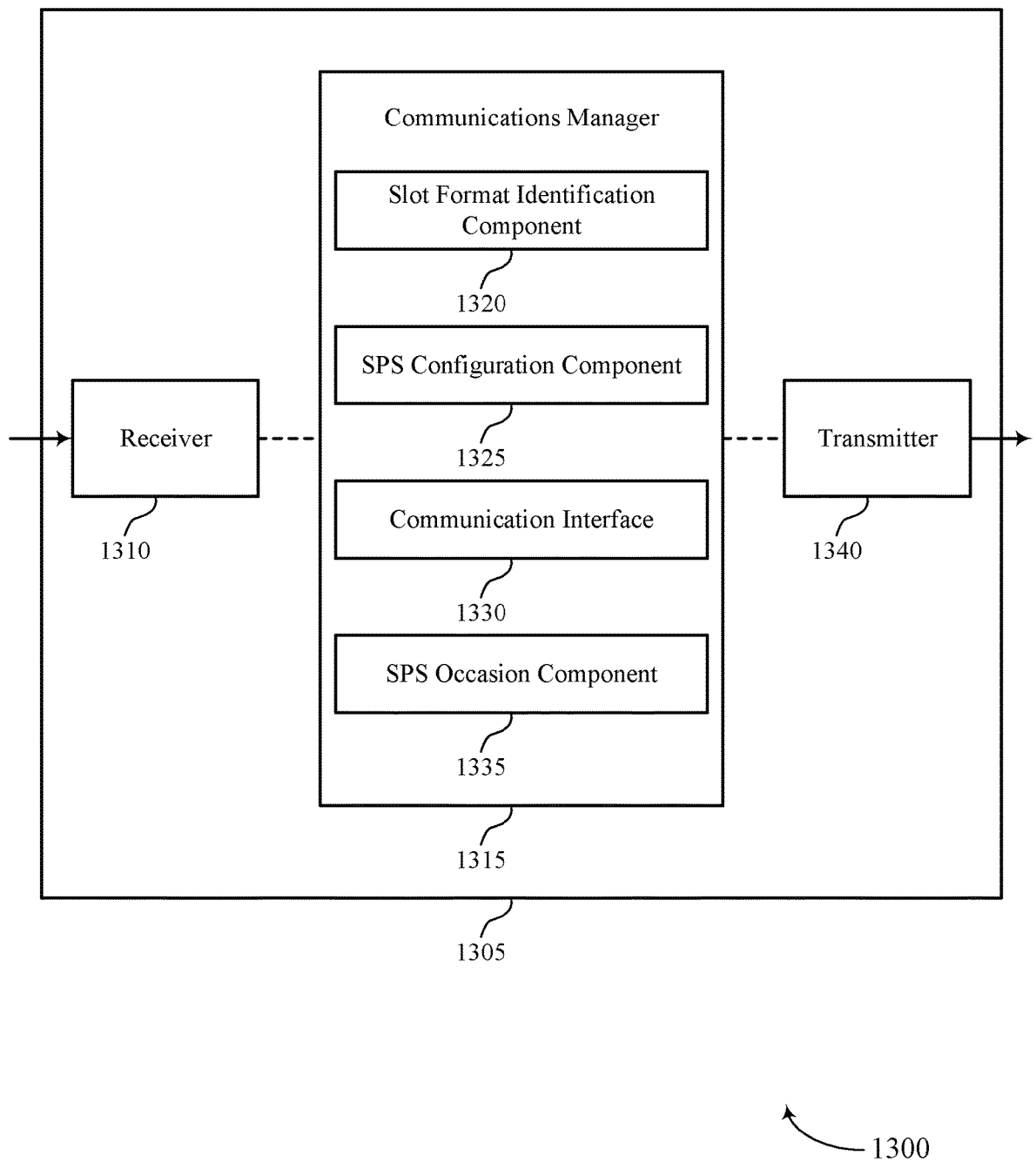

FIG. 13 shows a block diagram 1300 of a device 1305 that supports semi-persistent scheduling for subband full-duplex slots in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to semi-persistent scheduling for subband full-duplex slots, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a slot format identification component 1320, an SPS configuration component 1325, a communication interface 1330, and an SPS occasion component 1335. The communications manager 1315 may be an example of aspects of the communications manager 1510 described herein.

The slot format identification component 1320 may identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain.

The SPS configuration component 1325 may transmit, to a UE, a set of semi-persistent scheduling configurations for receiving, by the UE, downlink transmissions from the base station, where each of the set of semi-persistent scheduling configurations is configured for one or more of the first set of slots and for corresponding slots of the subsequent pluralities of slots based on the slot format of each of the first set of slot.

The communication interface 1330 may communicate with the UE based on the set of semi-persistent scheduling configurations.

The slot format identification component 1320 may identify a slot format for a slot of a set of slots, where the slot format for the slot specifies uplink resources and downlink resources separated in a frequency domain.

The SPS configuration component 1325 may transmit, to a UE, at least one semi-persistent scheduling configuration for receiving, by the UE, downlink transmissions from the base station.

The SPS occasion component 1335 may determine, for the slot of the set of slots, one or more semi-persistent scheduling occasions for transmission of at least one downlink shared channel transmission based on the slot format of the slot and the at least one semi-persistent scheduling configuration.

The communication interface 1330 may communicate with the UE based on determining the semi-persistent scheduling occasions for the slot.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
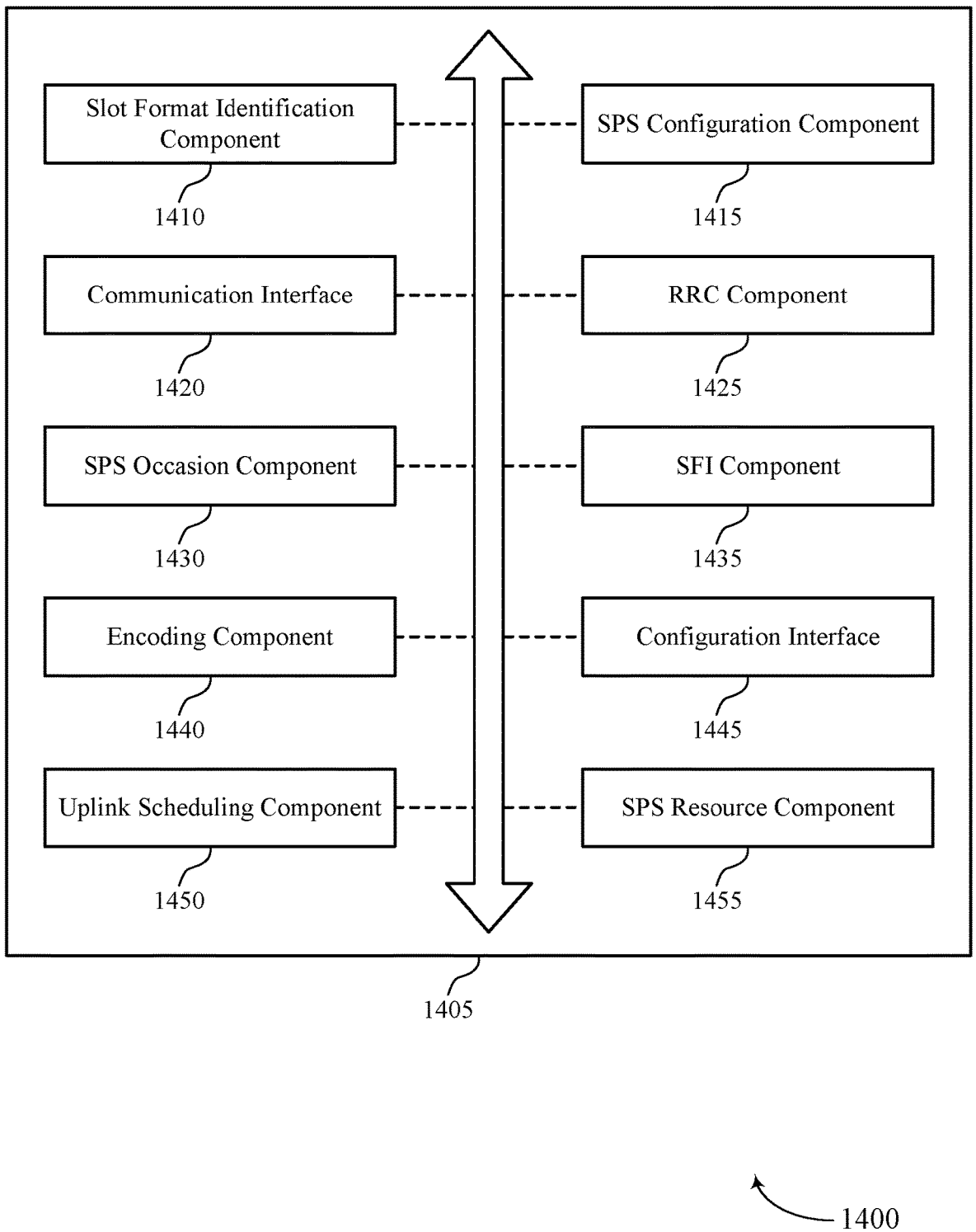
FIG. 14 shows a block diagram of a communications manager that supports semi-persistent scheduling for subband full-duplex slots in accordance with aspects of the present disclosure.

FIG. 14 shows a block diagram 1400 of a communications manager 1405 that supports semi-persistent scheduling for subband full-duplex slots in accordance with aspects of the present disclosure. The communications manager 1405 may be an example of aspects of a communications manager 1215, a communications manager 1315, or a communications manager 1510 described herein. The communications manager 1405 may include a slot format identification component 1410, an SPS configuration component 1415, a communication interface 1420, a RRC component 1425, an SPS occasion component 1430, a SFI component 1435, an encoding component 1440, a configuration interface 1445, an uplink scheduling component 1450, and an SPS resource component 1455. Each of these modules may communicate, directly or indirectly, with one another (e.g., via one or more buses).

The slot format identification component 1410 may identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain.

In some examples, the slot format identification component 1410 may identify a slot format for a slot of a set of slots, where the slot format for the slot specifies uplink resources and downlink resources separated in a frequency domain.

The SPS configuration component 1415 may transmit, to a UE, a set of semi-persistent scheduling configurations for receiving, by the UE, downlink transmissions from the base station, where each of the set of semi-persistent scheduling configurations is configured for one or more of the first set of slots and for corresponding slots of the subsequent pluralities of slots based on the slot format of each of the first set of slot.

In some examples, the SPS configuration component 1415 may transmit, to a UE, at least one semi-persistent scheduling configuration for receiving, by the UE, downlink transmissions from the base station.

In some examples, the SPS configuration component 1415 may transmit a periodicity value such that each of the set of semi-persistent scheduling configurations is configured for the one or more of the first set of slots and for corresponding slots of the subsequent pluralities of slots based on the periodicity value.

In some examples, transmitting the set of semi-persistent scheduling configurations includes a first semi-persistent scheduling configuration of the set of semi-persistent scheduling configurations that is configured for more than one slot of the first set of slots and for corresponding slots of the subsequent pluralities of slots, where the more than one slot each share a same slot format.

In some examples, the SPS configuration component 1415 may select one or more of the at least one semi-persistent scheduling configuration for transmitting the downlink transmissions for the slot based on a highest priority of the at least one semi-persistent scheduling configuration or a lowest index of the at least one semi-persistent scheduling configuration.

In some examples, the SPS configuration component 1415 may determine that a semi-persistent scheduling occasion for receiving the downlink shared channel transmission allocated by the at least one semi-persistent scheduling configuration overlaps with the uplink resources for the slot or guard resources for the slot.

In some examples, the SPS configuration component 1415 may determine the downlink transmissions for the slot are to be received in the resources of the semi-persistent scheduling occasion that are not overlapping with the uplink resources for the slot or the guard resources for the slot.

In some examples, the SPS configuration component 1415 may determine that a set of semi-persistent scheduling configurations are each configured for a respective slot format.

In some examples, the SPS configuration component 1415 may determine that a subset of the set of semi-persistent scheduling configurations are configured for respective slot formats that match the slot format of the slot.

In some examples, the SPS configuration component 1415 may select one of the subset of semi-persistent scheduling configurations for transmission of the at least one downlink shared channel transmission during the slot based on a highest priority or a lowest index of the subset of semi-persistent scheduling configurations.

In some examples, the SPS configuration component 1415 may determine that none of the set of semi-persistent scheduling configurations are configured for respective slot formats that match the slot format of the slot.

In some examples, the SPS configuration component 1415 may select one of the subset of semi-persistent scheduling configurations for transmission of the at least one downlink shared channel transmission during the slot based on a highest priority or a lowest index of the subset of semi-persistent scheduling configurations in accordance with determining that none of the set of semi-persistent scheduling configurations are configured for respective slot formats that match the slot format of the slot.

In some examples, the SPS configuration component 1415 may determine that the UE is not to receive the downlink transmissions in the first slot based on determining that none of the set of semi-persistent scheduling configurations are configured for respective slot formats that match the slot format of the slot.

In some examples, the SPS configuration component 1415 may identify that each of the at least one semi-persistent scheduling configuration includes an indication of a downlink bandwidth, a downlink bandwidth part index, or both, where determining the semi-persistent scheduling configuration that is configured for each slot is further based on each of the at least one semi-persistent scheduling configuration including the indication of the downlink bandwidth, the downlink bandwidth part index, or both.

In some examples, the SPS configuration component 1415 may determine that a first subset of semi-persistent scheduling configurations of the at least one semi-persistent scheduling configuration are each configured for a respective slot format.

In some examples, the SPS configuration component 1415 may determine that a second subset of semi-persistent scheduling configurations of the at least one semi-persistent scheduling configuration are not included in the first subset of semi-persistent scheduling configurations.

In some examples, the SPS configuration component 1415 may determine that one or more of the first subset of semi-persistent scheduling configurations are configured for respective slot formats that match the slot format of the slot.

In some examples, the SPS configuration component 1415 may select a semi-persistent scheduling configuration of the second subset for each slot based on a highest priority or a lowest index of semi-persistent scheduling configurations of the second subset.

In some examples, the SPS configuration component 1415 may select a semi-persistent scheduling configuration of the first subset and the second subset for each slot of the set of slots based on a highest priority or a lowest index of semi-persistent scheduling configurations of the first subset and the second subset.

In some examples, the SPS configuration component 1415 may determine that a semi-persistent scheduling occasion for receipt of the at least one downlink shared channel transmission at least partially overlaps with the uplink resources or guard resources of the slot based on determining the downlink resources.

In some examples, the SPS configuration component 1415 may identify an error condition based on the semi-persistent scheduling occasion at least partially overlapping with the uplink resources or the guard resources.

In some examples, the SPS configuration component 1415 may determine a semi-persistent scheduling occasion of the semi-persistent scheduling occasions in the slot for transmission of the at least one downlink shared channel transmission based on a smallest index or highest priority of the semi-persistent scheduling occasions that does not include resources that overlap with the uplink resources or the guard resources of the slot.

In some examples, the SPS configuration component 1415 may identify that the at least one semi-persistent scheduling configuration includes an indication that semi-persistent scheduling occasions associated with the at least one semi-persistent scheduling configuration are available for transmission of the at least one downlink shared channel transmission notwithstanding partial overlap with the uplink resources or the guard resources.

In some cases, the periodicity value specifies a value n number of slots such that a particular semi-persistent scheduling configuration of the set of semi-persistent scheduling configurations is configured for the nth slot in the first set of slots and the nth slot in the subsequent pluralities of slots.

In some cases, the at least one semi-persistent scheduling configuration is not associated with a downlink bandwidth or a downlink bandwidth part index.

The communication interface 1420 may communicate with the UE based on the set of semi-persistent scheduling configurations.

In some examples, the communication interface 1420 may communicate with the UE based on determining the semi-persistent scheduling occasions for the slot.

In some examples, the communication interface 1420 may transmit the downlink transmissions to the UE in downlink resources of the first set of slots allocated based on the set of semi-persistent scheduling configurations.

In some examples, the communication interface 1420 may refrain from transmitting the downlink shared channel transmission in the semi-persistent scheduling occasion based on the semi-persistent scheduling occasion at least partially overlapping with the uplink resources or the guard resources.

In some examples, the communication interface 1420 may transmit the downlink shared channel transmission in a different semi-persistent scheduling occasion associated with a different semi-persistent scheduling configuration, where the different semi-persistent scheduling occasion does not overlap with the uplink resources or guard resources of the slot.

In some examples, the communication interface 1420 may transmit, to the UE, the at least one downlink shared channel transmission in downlink resources of the semi-persistent scheduling occasion that includes the resources that overlap with the uplink resources or the guard resources of the slot.

In some examples, the communication interface 1420 may determine to transmit the at least one downlink shared channel transmission or to monitor for receipt of the one or more uplink transmissions based on a first priority associated with the one or more semi-persistent scheduling occasions and a second priority associated with the uplink grant.

In some examples, the communication interface 1420 may determine to transmit the at least one downlink shared channel transmission or to monitor for receipt of the one or more uplink transmissions is further based on a configuration received from the base station.

In some examples, the communication interface 1420 may determine to not monitor for receipt of the at least one downlink shared channel transmission or to transmit the one or more uplink transmissions based on a first priority associated with the one or more semi-persistent scheduling occasions and a second priority associated with the uplink grant being a same priority.

In some cases, at least one downlink transmission is transmitted in at least a portion of the downlink resources of the at least one slot.

In some cases, the at least one downlink shared channel transmission is received via coded bits on resources that are rate-matched around the resources that overlap.

In some cases, the at least one downlink shared channel transmission is punctured by the resources that overlap.

The SPS occasion component 1430 may determine, for the slot of the set of slots, one or more semi-persistent scheduling occasions for transmission of at least one downlink shared channel transmission based on the slot format of the slot and the at least one semi-persistent scheduling configuration.

The RRC component 1425 may transmit a radio resource control signal indicating the set of semi-persistent scheduling configurations.

In some cases, each of the set of semi-persistent scheduling configurations indicates a timing offset corresponding to a first subframe of a respective slot, duration of time-domain resources of the respective slot, frequency domain resources of the respective slot, or a combination thereof.

The SFI component 1435 may transmit, to the UE, a slot format indication that allocates at least a portion of the uplink resources for the slot.

In some examples, the SFI component 1435 may transmit, to the UE, a slot format indication that indicates the slot format of the slot.

The encoding component 1440 may encode the downlink resources of the semi-persistent scheduling occasion using a rank selected based on the semi-persistent scheduling occasion including the resources that overlap.

In some examples, the encoding component 1440 may select a second rank for the encoding that is higher than a first rank based on the semi-persistent scheduling occasion including the resources that overlap.

In some examples, the encoding component 1440 may encode the downlink resources of the semi-persistent scheduling occasion using a modulation and coding scheme selected based on the semi-persistent scheduling occasion including the resources that overlap.

In some examples, the encoding component 1440 may select a second modulation and coding scheme for the encoding that is higher than a first modulation and coding scheme based on the semi-persistent scheduling occasion including the resources that overlap.

In some examples, the encoding component 1440 may encode the downlink resources of the semi-persistent scheduling occasion using a modulation order selected based on the semi-persistent scheduling occasion including the resources that overlap.

In some examples, the encoding component 1440 may select a second modulation order for the encoding that is higher than a first modulation order based on the semi-persistent scheduling occasion including the resources that overlap.

The configuration interface 1445 may transmit, via radio resource control signaling, medium access control element signaling, or downlink control information signaling, an indication of a rate matching configuration, a puncturing configuration, a rank configuration, a modulation and coding scheme configuration, a modulation order configuration, or a combination thereof.

In some cases, the at least one downlink shared channel transmission is transmitted in accordance with the indication.

The uplink scheduling component 1450 may transmit, to the UE, an uplink grant that allocates resources of the slot for one or more uplink transmissions.

In some cases, the one or more uplink transmissions include an uplink shared channel transmission, an uplink control channel transmission, a sounding reference signal transmission, or a combination thereof.

In some cases, the uplink grant includes a configured grant.

The SPS resource component 1455 may determine that the one or more semi-persistent scheduling occasions overlaps with the resources allocated by the uplink grant.

In some examples, the SPS resource component 1455 may transmit the at least one downlink shared channel transmission in a subset of the resources of the one or more semi-persistent scheduling occasions that do not overlap with the resources allocated by the uplink grant.

Figure 15:
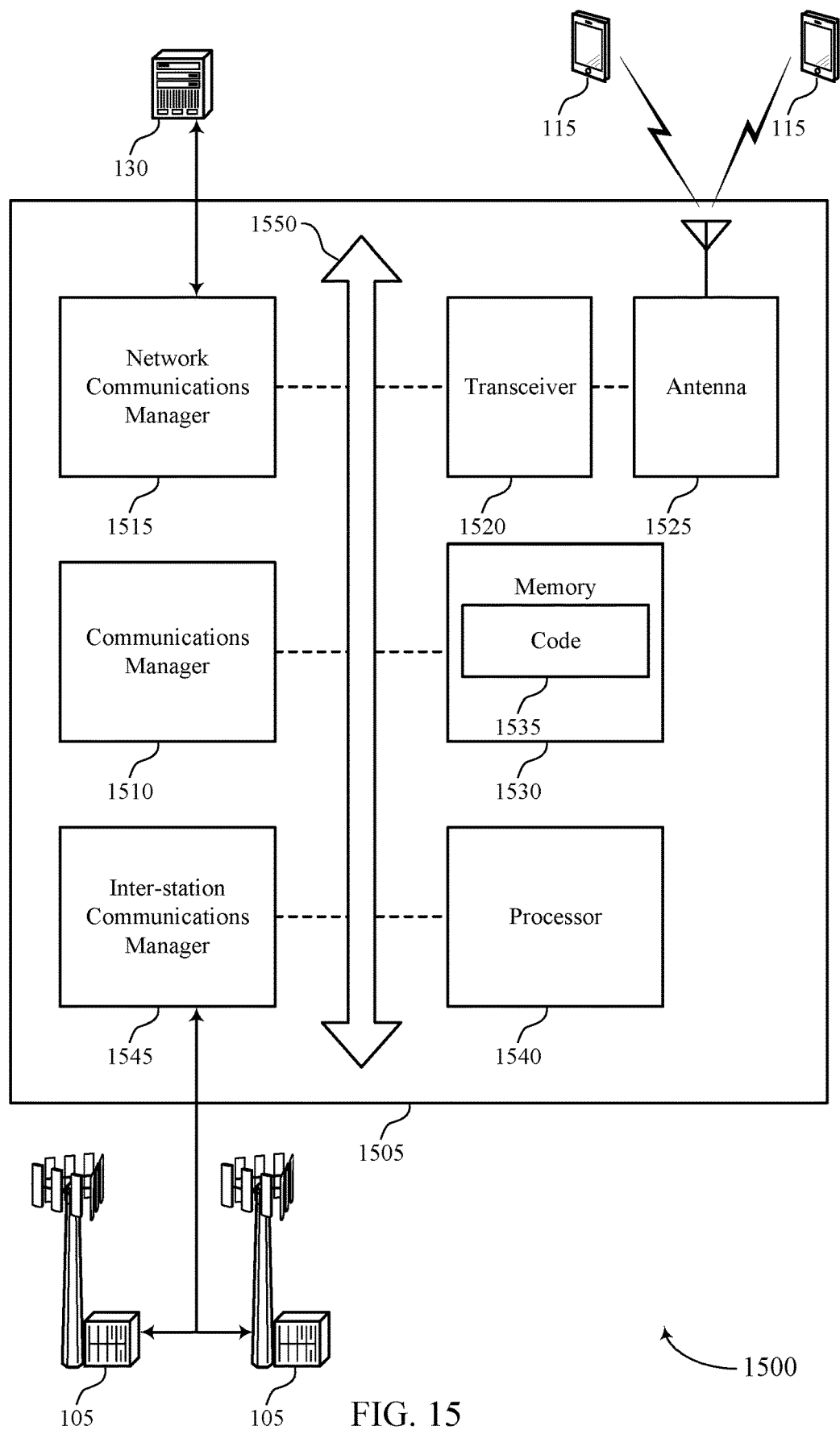
FIG. 15 shows a diagram of a system including a device that supports semi-persistent scheduling for subband full-duplex slots in accordance with aspects of the present disclosure.

FIG. 15 shows a diagram of a system 1500 including a device 1505 that supports semi-persistent scheduling for subband full-duplex slots in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain, transmit, to a UE, a set of semi-persistent scheduling configurations for receiving, by the UE, downlink transmissions from the base station, where each of the set of semi-persistent scheduling configurations is configured for one or more of the first set of slots and for corresponding slots of the subsequent pluralities of slots based on the slot format of each of the first set of slot, and communicate with the UE based on the set of semi-persistent scheduling configurations. The communications manager 1510 may also identify a slot format for a slot of a set of slots, where the slot format for the slot specifies uplink resources and downlink resources separated in a frequency domain, transmit, to a UE, at least one semi-persistent scheduling configuration for receiving, by the UE, downlink transmissions from the base station, determine, for the slot of the set of slots, one or more semi-persistent scheduling occasions for transmission of at least one downlink shared channel transmission based on the slot format of the slot and the at least one semi-persistent scheduling configuration, and communicate with the UE based on determining the semi-persistent scheduling occasions for the slot.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting semi-persistent scheduling for subband full-duplex slots).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
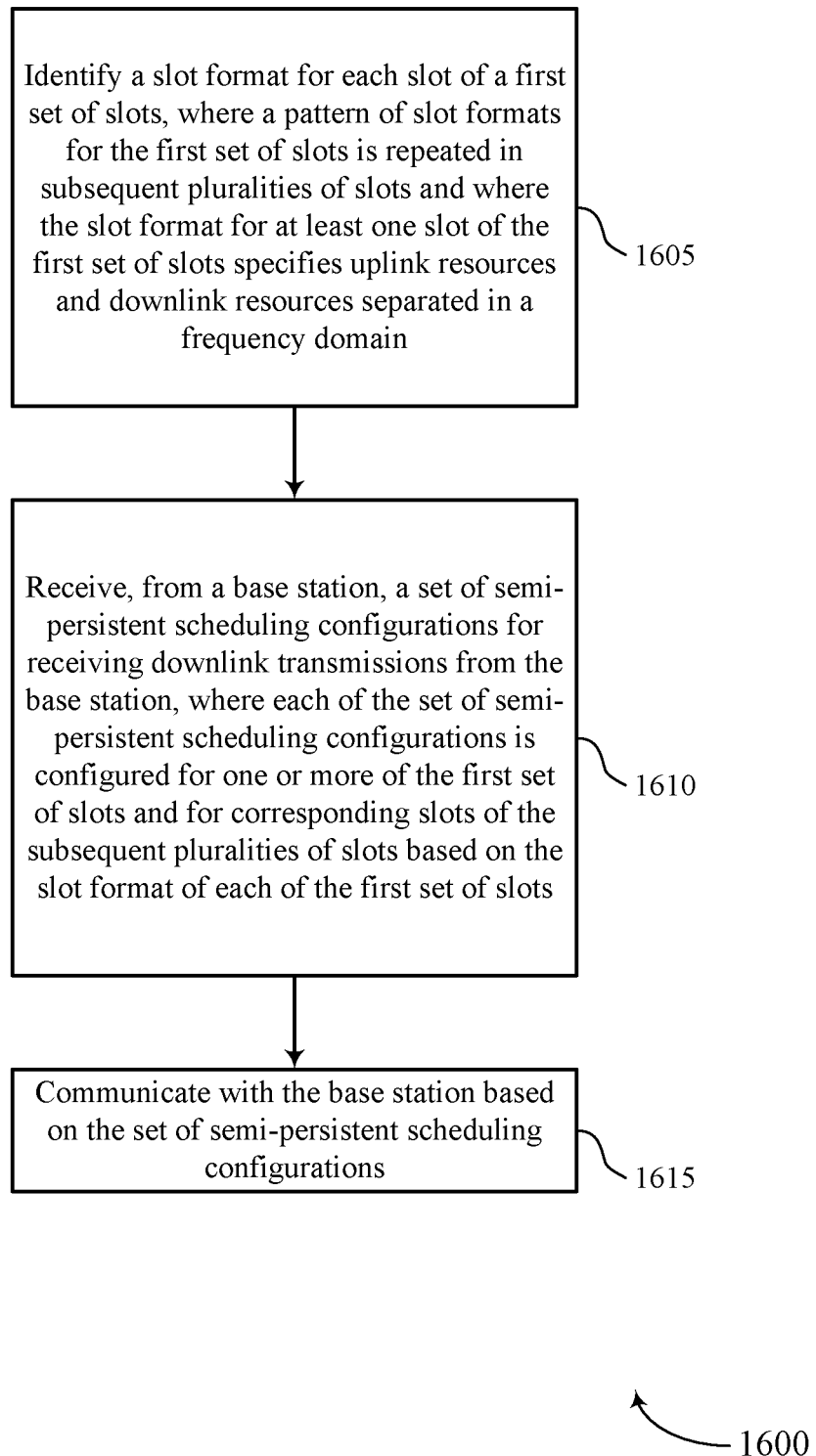
FIGS. 16 through 19 show flowcharts illustrating methods that support semi-persistent scheduling for subband full-duplex slots in accordance with aspects of the present disclosure.

FIG. 16 shows a flowchart illustrating a method 1600 that supports semi-persistent scheduling for subband full-duplex slots in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain. The operations of 1605 may be performed according to the methods described herein. In some examples, aspects of the operations of 1605 may be performed by a slot format identification component as described with reference to FIGS. 8 through 11.

At 1610, the UE may receive, from a base station, a set of semi-persistent scheduling configurations for receiving downlink transmissions from the base station, where each of the set of semi-persistent scheduling configurations is configured for one or more of the first set of slots and for corresponding slots of the subsequent pluralities of slots based on the slot format of each of the first set of slots. The operations of 1610 may be performed according to the methods described herein. In some examples, aspects of the operations of 1610 may be performed by an SPS configuration component as described with reference to FIGS. 8 through 11.

At 1615, the UE may communicate with the base station based on the set of semi-persistent scheduling configurations. The operations of 1615 may be performed according to the methods described herein. In some examples, aspects of the operations of 1615 may be performed by a communication interface as described with reference to FIGS. 8 through 11.

Figure 17:
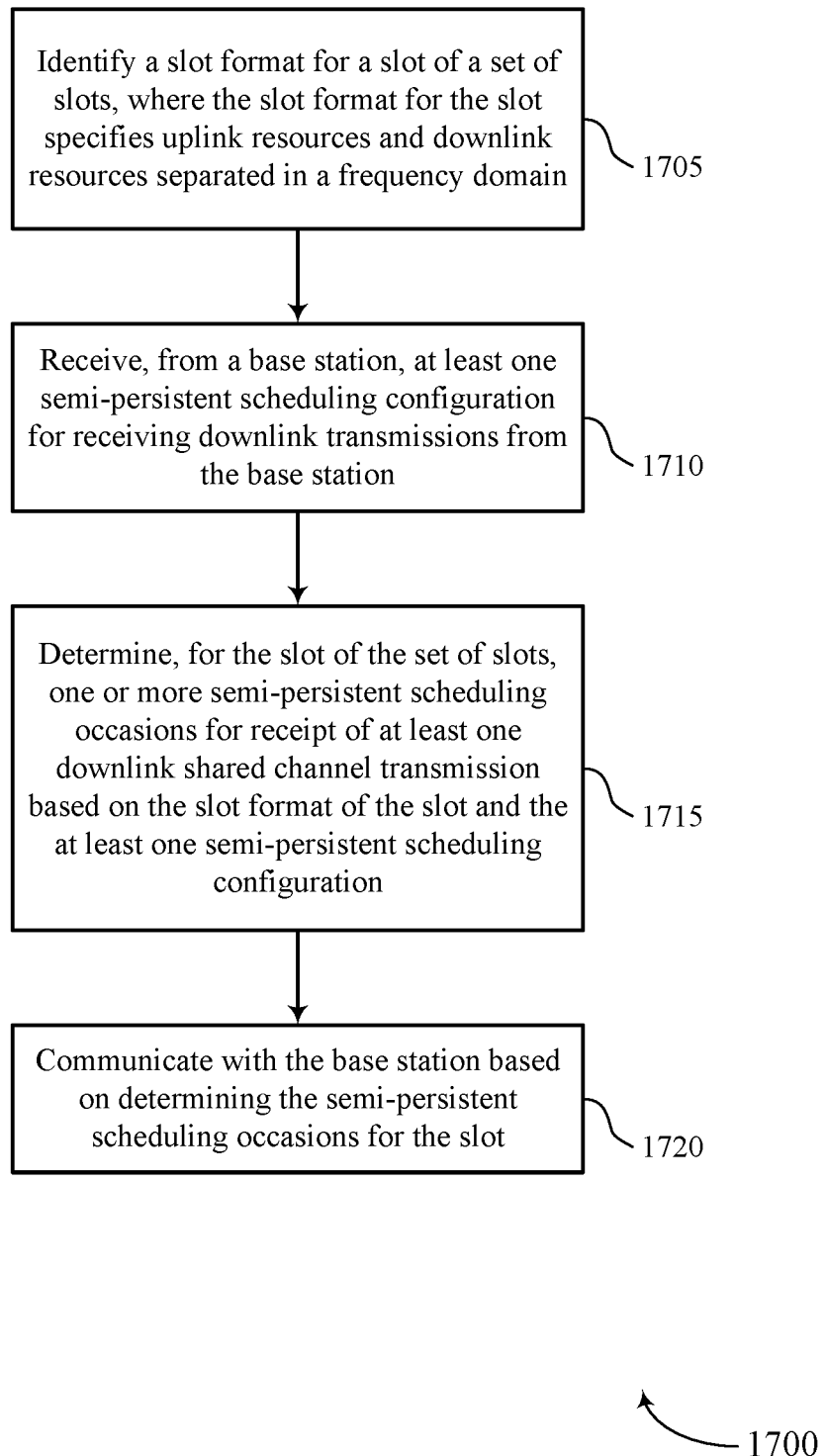

FIG. 17 shows a flowchart illustrating a method 1700 that supports semi-persistent scheduling for subband full-duplex slots in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may identify a slot format for a slot of a set of slots, where the slot format for the slot specifies uplink resources and downlink resources separated in a frequency domain. The operations of 1705 may be performed according to the methods described herein. In some examples, aspects of the operations of 1705 may be performed by a slot format identification component as described with reference to FIGS. 8 through 11.

At 1710, the UE may receive, from a base station, at least one semi-persistent scheduling configuration for receiving downlink transmissions from the base station. The operations of 1710 may be performed according to the methods described herein. In some examples, aspects of the operations of 1710 may be performed by an SPS configuration component as described with reference to FIGS. 8 through 11.

At 1715, the UE may determine, for the slot of the set of slots, one or more semi-persistent scheduling occasions for receipt of at least one downlink shared channel transmission based on the slot format of the slot and the at least one semi-persistent scheduling configuration. The operations of 1715 may be performed according to the methods described herein. In some examples, aspects of the operations of 1715 may be performed by an SPS occasion component as described with reference to FIGS. 8 through 11.

At 1720, the UE may communicate with the base station based on determining the semi-persistent scheduling occasions for the slot. The operations of 1720 may be performed according to the methods described herein. In some examples, aspects of the operations of 1720 may be performed by a communication interface as described with reference to FIGS. 8 through 11.

Figure 18:
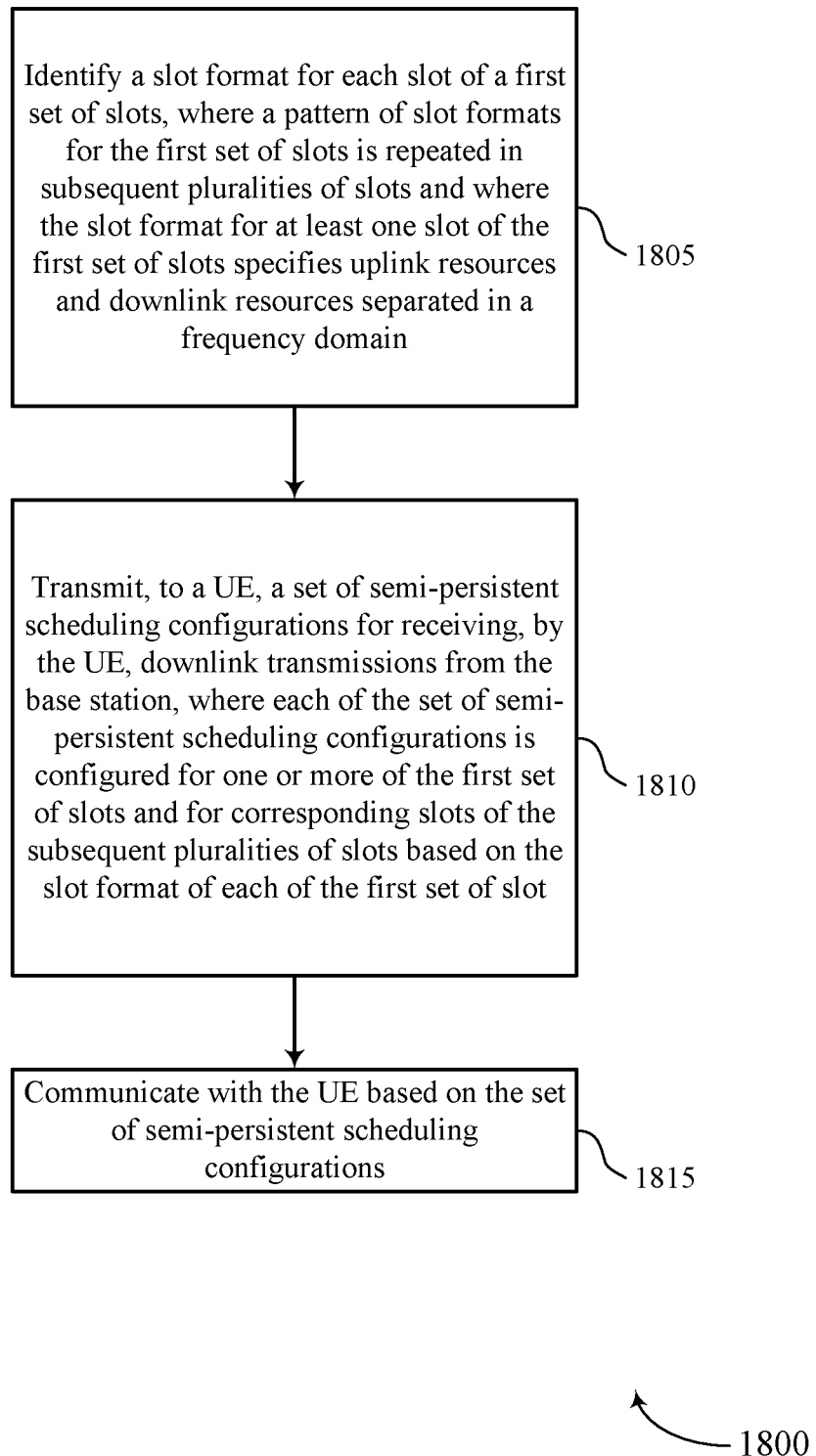

FIG. 18 shows a flowchart illustrating a method 1800 that supports semi-persistent scheduling for subband full-duplex slots in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may identify a slot format for each slot of a first set of slots, where a pattern of slot formats for the first set of slots is repeated in subsequent pluralities of slots and where the slot format for at least one slot of the first set of slots specifies uplink resources and downlink resources separated in a frequency domain. The operations of 1805 may be performed according to the methods described herein. In some examples, aspects of the operations of 1805 may be performed by a slot format identification component as described with reference to FIGS. 12 through 15.

At 1810, the base station may transmit, to a UE, a set of semi-persistent scheduling configurations for receiving, by the UE, downlink transmissions from the base station, where each of the set of semi-persistent scheduling configurations is configured for one or more of the first set of slots and for corresponding slots of the subsequent pluralities of slots based on the slot format of each of the first set of slot. The operations of 1810 may be performed according to the methods described herein. In some examples, aspects of the operations of 1810 may be performed by an SPS configuration component as described with reference to FIGS. 12 through 15.

At 1815, the base station may communicate with the UE based on the set of semi-persistent scheduling configurations. The operations of 1815 may be performed according to the methods described herein. In some examples, aspects of the operations of 1815 may be performed by a communication interface as described with reference to FIGS. 12 through 15.

Figure 19:
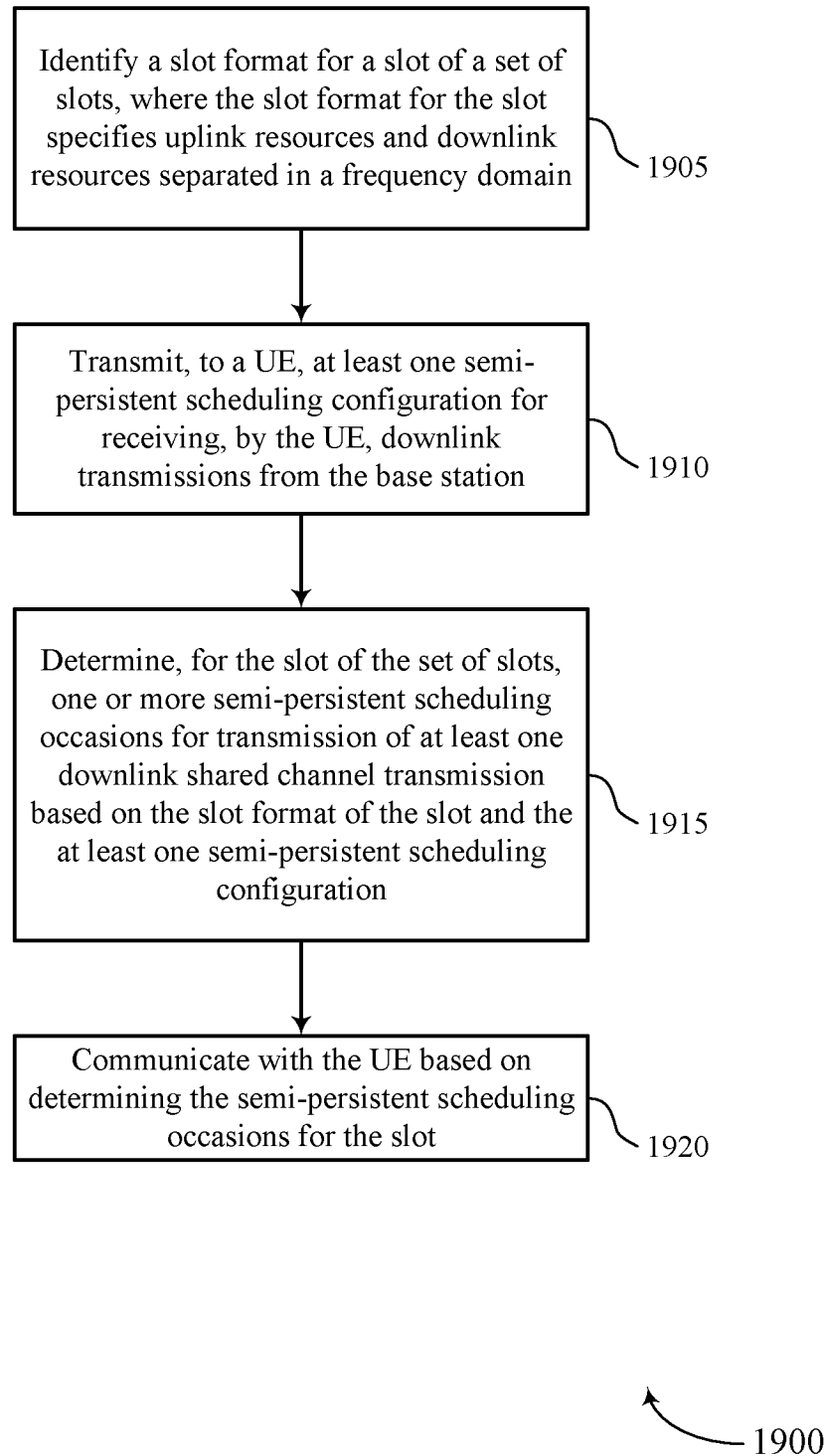

FIG. 19 shows a flowchart illustrating a method 1900 that supports semi-persistent scheduling for subband full-duplex slots in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may identify a slot format for a slot of a set of slots, where the slot format for the slot specifies uplink resources and downlink resources separated in a frequency domain. The operations of 1905 may be performed according to the methods described herein. In some examples, aspects of the operations of 1905 may be performed by a slot format identification component as described with reference to FIGS. 12 through 15.

At 1910, the base station may transmit, to a UE, at least one semi-persistent scheduling configuration for receiving, by the UE, downlink transmissions from the base station. The operations of 1910 may be performed according to the methods described herein. In some examples, aspects of the operations of 1910 may be performed by an SPS configuration component as described with reference to FIGS. 12 through 15.

At 1915, the base station may determine, for the slot of the set of slots, one or more semi-persistent scheduling occasions for transmission of at least one downlink shared channel transmission based on the slot format of the slot and the at least one semi-persistent scheduling configuration. The operations of 1915 may be performed according to the methods described herein. In some examples, aspects of the operations of 1915 may be performed by an SPS occasion component as described with reference to FIGS. 12 through 15.

At 1920, the base station may communicate with the UE based on determining the semi-persistent scheduling occasions for the slot. The operations of 1920 may be performed according to the methods described herein. In some examples, aspects of the operations of 1920 may be performed by a communication interface as described with reference to FIGS. 12 through 15.

Example 1: A method of wireless communications at a user equipment (UE) comprising: identifying a slot format for each slot of a first plurality of slots, wherein a pattern of slot formats for the first plurality of slots is repeated in subsequent pluralities of slots and wherein the slot format for at least one slot of the first plurality of slots specifies uplink resources and downlink resources separated in a frequency domain; receiving, from a base station, a plurality of semi-persistent scheduling configurations for receiving downlink transmissions from the base station, wherein each of the plurality of semi-persistent scheduling configurations is configured for one or more of the first plurality of slots and for corresponding slots of the subsequent pluralities of slots based at least in part on the slot format of each of the first plurality of slots; and communicating with the base station based at least in part on the plurality of semi-persistent scheduling configurations.

Example 2: A method of example 1, wherein receiving the plurality of semi-persistent scheduling configurations comprises: receiving a periodicity value such that each of the plurality of semi-persistent scheduling configurations is configured for the one or more of the first plurality of slots and for corresponding slots of the subsequent pluralities of slots based at least in part on the periodicity value.

Example 3: A method of example 2, wherein the periodicity value specifies a value n number of slots such that a particular semi-persistent scheduling configuration of the plurality of semi-persistent scheduling configurations is configured for the nth slot in the first plurality of slots and the nth slot in the subsequent pluralities of slots.

Example 4: A method of any of examples 1 to 3, wherein receiving the plurality of semi-persistent scheduling configurations comprises: receiving a first semi-persistent scheduling configuration of the plurality of semi-persistent scheduling configurations that is configured for more than one slot of the first plurality of slots and for corresponding slots of the subsequent pluralities of slots, wherein the more than one slot each share a same slot format.

Example 5: A method of any of examples 1 to 4, wherein communicating with the base station comprises: receiving the downlink transmissions from the base station in downlink resources of the first plurality of slots allocated based at least in part on the plurality of semi-persistent scheduling configurations.

Example 6: A method of example 5, wherein at least one downlink transmission is received in at least a portion of the downlink resources of the at least one slot.

Example 7: A method of any of examples 1 to 6, wherein receiving the plurality of semi-persistent scheduling configurations comprises: receiving a radio resource control signal indicating the plurality of semi-persistent scheduling configurations.

Example 8: The method of any of examples 1 to 7, wherein each of the plurality of semi-persistent scheduling configurations indicates a timing offset corresponding to a first subframe of a respective slot, duration of time-domain resources of the respective slot, frequency domain resources of the respective slot, or a combination thereof.

Example 9: A method for wireless communications at a user equipment (UE), comprising: identifying a slot format for a slot of a plurality of slots, wherein the slot format for the slot specifies uplink resources and downlink resources separated in a frequency domain; receiving, from a base station, at least one semi-persistent scheduling configuration for receiving downlink transmissions from the base station; determining, for the slot of the plurality of slots, one or more semi-persistent scheduling occasions for receipt of at least one downlink shared channel transmission based at least in part on the slot format of the slot and the at least one semi-persistent scheduling configuration; and communicating with the base station based at least in part on determining the semi-persistent scheduling occasions for the slot.

Example 10: The method of example 9, further comprising: selecting one or more of the at least one semi-persistent scheduling configuration for receiving the downlink transmissions for the slot based at least in part on a highest priority of the at least one semi-persistent scheduling configuration or a lowest index of the at least one semi-persistent scheduling configuration.

Example 11: The method of any of examples 9 and 10, further comprising: determining that a semi-persistent scheduling occasion for receiving the downlink shared channel transmission allocated by the at least one semi-persistent scheduling configuration overlaps with the uplink resources for the slot or guard resources for the slot; and determining the downlink transmissions for the slot are to be received in the resources of the semi-persistent scheduling occasion that are not overlapping with the uplink resources for the slot or the guard resources for the slot.

Example 12: The method of any of examples 9 to 11, further comprising: receiving, from the base station, a slot format indication that allocates at least a portion of the uplink resources for the slot.

Example 13: The method of any of examples 9 to 12, wherein the at least one semi-persistent scheduling configuration is not associated with a downlink bandwidth or a downlink bandwidth part index.

Example 14: The method of any of examples 9 to 13, determining that a plurality of semi-persistent scheduling configurations are each configured for a respective slot format.

Example 15: The method of example 14, wherein determining the one or more semi-persistent scheduling occasions for receipt of the at least one downlink shared channel transmission comprises: determining that a subset of the plurality of semi-persistent scheduling configurations are configured for respective slot formats that match the slot format of the slot.

Example 16: The method of example 15, further comprising: selecting one of the subset of semi-persistent scheduling configurations for receipt of the at least one downlink shared channel transmission during the slot based at least in part on a highest priority or a lowest index of the subset of semi-persistent scheduling configurations.

Example 17: The method of example 14, wherein determining the one or more semi-persistent scheduling occasions for receipt of the at least one downlink shared channel transmission comprises: determining that none of the plurality of semi-persistent scheduling configurations are configured for respective slot formats that match the slot format of the slot.

Example 18: The method of example 17, further comprising: selecting one of the semi-persistent scheduling configurations for receipt of the at least one downlink shared channel transmission during the slot based at least in part on a highest priority or a lowest index of the semi-persistent scheduling configurations in accordance with determining that none of the plurality of semi-persistent scheduling configurations are configured for respective slot formats that match the slot format of the slot.

Example 19: The method of example 17, further comprising: determining that the UE is not to receive the downlink transmissions in the first slot based at least in part on determining that none of the plurality of semi-persistent scheduling configurations are configured for respective slot formats that match the slot format of the slot.

Example 20: The method of any of examples 14 to 17, further comprising: identifying that each of the at least one semi-persistent scheduling configuration includes an indication of a downlink bandwidth, a downlink bandwidth part index, or both, wherein determining the semi-persistent scheduling configuration that is configured for each slot is further based at least in part on each of the at least one semi-persistent scheduling configuration including the indication of the downlink bandwidth, the downlink bandwidth part index, or both.

Example 21: The method of any of examples 9 to 14 and 20, further comprising: determining that a first subset of semi-persistent scheduling configurations of the at least one semi-persistent scheduling configuration are each configured for a respective slot format; and determining that a second subset of semi-persistent scheduling configurations of the at least one semi-persistent scheduling configuration are not included in the first subset of semi-persistent scheduling configurations.

Example 22: The method of example 21, wherein determining the one or more semi-persistent scheduling occasions for receipt of the at least one downlink shared channel transmission comprises: determining that one or more of the first subset of semi-persistent scheduling configurations are configured for respective slot formats that match the slot format of the slot.

Example 23: The method of example 21, further comprising: selecting a semi-persistent scheduling configuration of the second subset for each slot based at least in part on a highest priority or a lowest index of semi-persistent scheduling configurations of the second subset.

Example 24: The method of example 21, further comprising: selecting a semi-persistent scheduling configuration of the first subset and the second subset for each slot of the plurality of slots based at least in part on a highest priority or a lowest index of semi-persistent scheduling configurations of the first subset and the second subset.

Example 25: The method of any of examples 9 to 24, further comprising: receiving, from the base station, a slot format indication that indicates the slot format of the slot.

Example 26: The method of any of examples 9 to 25, further comprising: determining that a semi-persistent scheduling occasion for receipt of the at least one downlink shared channel transmission at least partially overlaps with the uplink resources or guard resources of the slot based at least in part on determining the downlink resources.

Example 27: The method of example 26, further comprising: identifying an error condition based at least in part on the semi-persistent scheduling occasion at least partially overlapping with the uplink resources or the guard resources.

Example 28: The method of any of examples 26 and 27, further comprising: refraining from monitoring the semi-persistent scheduling occasion for receipt of the at least one downlink shared channel transmission based on the semi-persistent scheduling occasion at least partially overlapping with the uplink resources or the guard resources; and monitoring a different semi-persistent scheduling occasion associated with a different semi-persistent scheduling configuration, wherein the different semi-persistent scheduling occasion does not overlap with the uplink resources or guard resources of the slot.

Example 29: The method of any of examples 26 to 28, further comprising: determining a semi-persistent scheduling occasion of the semi-persistent scheduling occasions in the slot for receipt of the at least one downlink shared channel transmission based at least in part on a smallest index or highest priority of the semi-persistent scheduling occasions that does not include resources that overlap with the uplink resources or the guard resources of the slot.

Example 30: The method of examples 26 and 27, further comprising: identifying that the at least one semi-persistent scheduling configuration includes an indication that semi-persistent scheduling occasions associated with the at least one semi-persistent scheduling configuration are available for receipt of the at least one downlink shared channel transmission notwithstanding partial overlap with the uplink resources or the guard resources.

Example 31: The method of any of examples 26, 27, and 30, further comprising: receiving, from the base station, the at least one downlink shared channel transmission in downlink resources of the semi-persistent scheduling occasion including the resources that overlap with the uplink resources or the guard resources of the slot.

Example 32: The method of any of examples 26, 27, 30, and 31, wherein the at least one downlink shared channel transmission is received via coded bits on resources that are rate-matched around the resources that overlap.

Example 33: The method of any of examples 26, 27, and 30 to 32, wherein the at least one downlink shared channel transmission is punctured by the resources that overlap.

Example 34: The method of any of examples 26, 27, and 30 to 33, further comprising: performing blind decoding on the downlink resources of the semi-persistent scheduling occasion based at least in part on at least one rank configured at the UE.

Example 35: The method of any of examples 26, 27, and 30 to 34, wherein the downlink shared channel transmission is decoded in accordance with a second rank that is higher than a first rank based at least in part on performing the blind decoding.

Example 36: The method of any of examples 26, 27, and 30 to 35, further comprising: decoding the at least one downlink shared channel transmission using at least one modulation and coding scheme configured at the UE.

Example 37: The method of any of examples 26, 27, and 30 to 36, wherein the downlink shared channel transmission is decoded in accordance with a second modulation and coding scheme that is higher than a first modulation and coding scheme.

Example 38: The method of any of examples 26, 27, and 30 to 37, further comprising: decoding the at least one downlink shared channel transmission using at least one modulation order configured at the UE.

Example 39: The method of any of examples 26, 27, and 30 to 38 wherein the downlink shared channel transmission is decoded in accordance with a second modulation order that is higher than a first modulation order.

Example 40: The method of any of examples 26, 27, and 30 to 39, further comprising: receiving, via radio resource control signaling, medium access control element signaling, or downlink control information signaling, an indication of a rate matching configuration, a puncturing configuration, a rank configuration, a modulation and coding scheme configuration, a modulation order configuration, or a combination thereof.

Example 41: The method of example 40, wherein the at least one downlink shared channel transmission is received in accordance with the indication.

Example 42: The method of any of examples 9 to 41, further comprising: receiving, from the base station, an uplink grant that allocates resources of the slot for one or more uplink transmissions.

Example 43: The method of example 42: further comprising: determining that the one or more semi-persistent scheduling occasions overlaps with the resources allocated by the uplink grant.

Example 44: The method of example 43, further comprising: monitoring for the at least one downlink shared channel transmission in a subset of the resources of the one or more semi-persistent scheduling occasions that do not overlap with the resources allocated by the uplink grant.

Example 45: The method of example 43 or 44, further comprising: determining to monitor for the at least one downlink shared channel transmission or to transmit the one or more uplink transmissions based at least in part on a first priority associated with the one or more semi-persistent scheduling occasions and a second priority associated with the uplink grant.

Example 46: The method of example 45, wherein the determining to monitor for the at least one downlink shared channel transmission or to transmit the one or more uplink transmissions is further based at least in part on a configuration received from the base station.

Example 47: The method of example 43, further comprising: determining to not monitor for the at least one downlink shared channel transmission and to not transmit the one or more uplink transmissions based at least in part on a first priority associated with the one or more semi-persistent scheduling occasions and a second priority associated with the uplink grant being a same priority.

Example 48: The method of any of examples 43 to 47, wherein the one or more uplink transmissions comprise an uplink shared channel transmission, an uplink control channel transmission, a sounding reference signal transmission, or a combination thereof.

Example 49: The method of any of examples 43 to 48, wherein the uplink grant comprises a configured grant.

Example 50: A method of wireless communications at a base station, comprising: identifying a slot format for each slot of a first plurality of slots, wherein a pattern of slot formats for the first plurality of slots is repeated in subsequent pluralities of slots and wherein the slot format for at least one slot of the first plurality of slots specifies uplink resources and downlink resources separated in a frequency domain; transmitting, to a user equipment (UE), a plurality of semi-persistent scheduling configurations for receiving, by the UE, downlink transmissions from the base station, wherein each of the plurality of semi-persistent scheduling configurations is configured for one or more of the first plurality of slots and for corresponding slots of the subsequent pluralities of slots based at least in part on the slot format of each of the first plurality of slot; and communicating with the UE based at least in part on the plurality of semi-persistent scheduling configurations.

Example 51: The method of example 50, wherein transmitting the plurality of semi-persistent scheduling configurations comprises: transmitting a periodicity value such that each of the plurality of semi-persistent scheduling configurations is configured for the one or more of the first plurality of slots and for corresponding slots of the subsequent pluralities of slots based at least in part on the periodicity value.

Example 52: The method of example 51, wherein the periodicity value specifies a value n number of slots such that a particular semi-persistent scheduling configuration of the plurality of semi-persistent scheduling configurations is configured for the nth slot in the first plurality of slots and the nth slot in the subsequent pluralities of slots.

Example 53: The method of any of examples 50 to 52, further comprising: transmitting the plurality of semi-persistent scheduling configurations comprises a first semi-persistent scheduling configuration of the plurality of semi-persistent scheduling configurations that is configured for more than one slot of the first plurality of slots and for corresponding slots of the subsequent pluralities of slots, wherein the more than one slot each share a same slot format.

Example 54: The method of any of examples 50 to 53, wherein communicating with the UE comprises: transmitting the downlink transmissions to the UE in downlink resources of the first plurality of slots allocated based at least in part on the plurality of semi-persistent scheduling configurations.

Example 55: The method of example 54, wherein at least one downlink transmission is transmitted in at least a portion of the downlink resources of the at least one slot.

Example 56: The method of any of examples 50 to 55, wherein transmitting the plurality of semi-persistent scheduling configurations comprises: transmitting a radio resource control signal indicating the plurality of semi-persistent scheduling configurations.

Example 57: The method of any of examples 50 to 56, wherein each of the plurality of semi-persistent scheduling configurations indicates a timing offset corresponding to a first subframe of a respective slot, duration of time-domain resources of the respective slot, frequency domain resources of the respective slot, or a combination thereof.

Example 58: A method of wireless communications at a base station, comprising: identifying a slot format for a slot of a plurality of slots, wherein the slot format for the slot specifies uplink resources and downlink resources separated in a frequency domain; transmitting, to a user equipment (UE), at least one semi-persistent scheduling configuration for receiving, by the UE, downlink transmissions from the base station; determining, for the slot of the plurality of slots, one or more semi-persistent scheduling occasions for transmission of at least one downlink shared channel transmission based at least in part on the slot format of the slot and the at least one semi-persistent scheduling configuration; and communicating with the UE based at least in part on determining the semi-persistent scheduling occasions for the slot.

Example 59: The method of example 58, further comprising: selecting one or more of the at least one semi-persistent scheduling configuration for transmitting the downlink transmissions for the slot based at least in part on a highest priority of the at least one semi-persistent scheduling configuration or a lowest index of the at least one semi-persistent scheduling configuration.

Example 60: The method of example 58 or 59, further comprising: determining that a semi-persistent scheduling occasion for receiving the downlink shared channel transmission allocated by the at least one semi-persistent scheduling configuration overlaps with the uplink resources for the slot or guard resources for the slot; and determining the downlink transmissions for the slot are to be received in the resources of the semi-persistent scheduling occasion that are not overlapping with the uplink resources for the slot or the guard resources for the slot.

Example 61: The method of any of examples 50 to 60, further comprising: transmitting, to the UE, a slot format indication that allocates at least a portion of the uplink resources for the slot.

Example 62: The method of any of examples 50 to 61, wherein the at least one semi-persistent scheduling configuration is not associated with a downlink bandwidth or a downlink bandwidth part index.

Example 63: The method of examples 58 to 61, further comprising: determining that a plurality of semi-persistent scheduling configurations are each configured for a respective slot format.

Example 64: The method of examples 58 to 61 and 63, wherein determining the one or more semi-persistent scheduling occasions for receipt of the at least one downlink shared channel transmission comprises: determining that a subset of the plurality of semi-persistent scheduling configurations are configured for respective slot formats that match the slot format of the slot.

Example 65: The method of example 64, further comprising: selecting one of the subset of semi-persistent scheduling configurations for transmission of the at least one downlink shared channel transmission during the slot based at least in part on a highest priority or a lowest index of the subset of semi-persistent scheduling configurations.

Example 66: The method of example 63, wherein determining the one or more semi-persistent scheduling occasions for transmission of the at least one downlink shared channel transmission comprises: determining that none of the plurality of semi-persistent scheduling configurations are configured for respective slot formats that match the slot format of the slot Example 67: The method of example 66, further comprising: selecting one of the semi-persistent scheduling configurations for transmission of the at least one downlink shared channel transmission during the slot based at least in part on a highest priority or a lowest index of the semi-persistent scheduling configurations in accordance with determining that none of the plurality of semi-persistent scheduling configurations are configured for respective slot formats that match the slot format of the slot.

Example 68: The method of example 66, further comprising: determining that the UE is not to receive the downlink transmissions in the first slot based at least in part on determining that none of the plurality of semi-persistent scheduling configurations are configured for respective slot formats that match the slot format of the slot.

Example 69: The method of any of examples 63 to 68, further comprising: identifying that each of the at least one semi-persistent scheduling configuration includes an indication of a downlink bandwidth, a downlink bandwidth part index, or both, wherein determining the semi-persistent scheduling configuration that is configured for each slot is further based at least in part on each of the at least one semi-persistent scheduling configuration including the indication of the downlink bandwidth, the downlink bandwidth part index, or both.

Example 70: The method of any of examples 58 to 61 and 63, further comprising: determining that a first subset of semi-persistent scheduling configurations of the at least one semi-persistent scheduling configuration are each configured for a respective slot format; and determining that a second subset of semi-persistent scheduling configurations of the at least one semi-persistent scheduling configuration are not included in the first subset of semi-persistent scheduling configurations.

Example 71: The method of example 70 wherein determining the one or more semi-persistent scheduling occasions for transmission of the at least one downlink shared channel transmission comprises: determining that one or more of the first subset of semi-persistent scheduling configurations are configured for respective slot formats that match the slot format of the slot.

Example 72: The method of example 70, further comprising: selecting a semi-persistent scheduling configuration of the second subset for each slot based at least in part on a highest priority or a lowest index of semi-persistent scheduling configurations of the second subset.

Example 73: The method of example 70 or 71, further comprising: selecting a semi-persistent scheduling configuration of the first subset and the second subset for each slot of the plurality of slots based at least in part on a highest priority or a lowest index of semi-persistent scheduling configurations of the first subset and the second subset.

Example 74: The method of any of examples 58 to 74, further comprising: transmitting, to the UE, a slot format indication that indicates the slot format of the slot.

Example 75: The method of any of examples 58 to 74, further comprising: determining that a semi-persistent scheduling occasion for receipt of the at least one downlink shared channel transmission at least partially overlaps with the uplink resources or guard resources of the slot based at least in part on determining the downlink resources.

Example 76: The method of example 75, further comprising: identifying an error condition based at least in part on the semi-persistent scheduling occasion at least partially overlapping with the uplink resources or the guard resources.

Example 77: The method of example 75 or 76, further comprising: refraining from transmitting the downlink shared channel transmission in the semi-persistent scheduling occasion based at least in part on the semi-persistent scheduling occasion at least partially overlapping with the uplink resources or the guard resources; and transmitting the downlink shared channel transmission in a different semi-persistent scheduling occasion associated with a different semi-persistent scheduling configuration, wherein the different semi-persistent scheduling occasion does not overlap with the uplink resources or guard resources of the slot.

Example 78: The method of any of examples 75 to 77, further comprising: determining a semi-persistent scheduling occasion of the semi-persistent scheduling occasions in the slot for transmission of the at least one downlink shared channel transmission based at least in part on a smallest index or highest priority of the semi-persistent scheduling occasions that does not include resources that overlap with the uplink resources or the guard resources of the slot.

Example 79: The method of any of examples 75 or 76, further comprising: identifying that the at least one semi-persistent scheduling configuration includes an indication that semi-persistent scheduling occasions associated with the at least one semi-persistent scheduling configuration are available for transmission of the at least one downlink shared channel transmission notwithstanding partial overlap with the uplink resources or the guard resources.

Example 80: The method of any of examples 75, 76, or 79, further comprising: transmitting, to the UE, the at least one downlink shared channel transmission in downlink resources of the semi-persistent scheduling occasion that includes the resources that overlap with the uplink resources or the guard resources of the slot.

Example 81: The method of example 80, wherein the at least one downlink shared channel transmission is received via coded bits on resources that are rate-matched around the resources that overlap.

Example 82: The method of examples 80 or 81, wherein the at least one downlink shared channel transmission is punctured by the resources that overlap.

Example 83: The method of any of examples 80 to 82, further comprising: encoding the downlink resources of the semi-persistent scheduling occasion using a rank selected based at least in part on the semi-persistent scheduling occasion including the resources that overlap.

Example 84: The method of any of examples 80 to 83, further comprising: selecting a second rank for the encoding that is higher than a first rank based at least in part on the semi-persistent scheduling occasion including the resources that overlap.

Example 85: The method of any of examples 80 to 84, further comprising: encoding the downlink resources of the semi-persistent scheduling occasion using a modulation and coding scheme selected based at least in part on the semi-persistent scheduling occasion including the resources that overlap.

Example 86: The method of any of examples 80 to 85, further comprising: selecting a second modulation and coding scheme for the encoding that is higher than a first modulation and coding scheme based at least in part on the semi-persistent scheduling occasion including the resources that overlap.

Example 87: The method of any of examples 80 to 86, further comprising: encoding the downlink resources of the semi-persistent scheduling occasion using a modulation order selected based at least in part on the semi-persistent scheduling occasion including the resources that overlap.

Example 88: The method of any of examples 80 to 87, further comprising: selecting a second modulation order for the encoding that is higher than a first modulation order based at least in part on the semi-persistent scheduling occasion including the resources that overlap.

Example 89: The method of any of examples 80 to 88, further comprising: transmitting, via radio resource control signaling, medium access control element signaling, or downlink control information signaling, an indication of a rate matching configuration, a puncturing configuration, a rank configuration, a modulation and coding scheme configuration, a modulation order configuration, or a combination thereof.

Example 90: The method of any of examples 80 to 89, wherein the at least one downlink shared channel transmission is punctured by the resources that overlap.

Example 91: The method of any of examples 58 to 90, further comprising: transmitting, to the UE, an uplink grant that allocates resources of the slot for one or more uplink transmissions.

Example 92: The method of example 91, further comprising: determining that the one or more semi-persistent scheduling occasions overlaps with the resources allocated by the uplink grant.

Example 93: The method of example 92, further comprising: transmitting the at least one downlink shared channel transmission in a subset of the resources of the one or more semi-persistent scheduling occasions that do not overlap with the resources allocated by the uplink grant.

Example 94: The method of example 92 or 93, further comprising: determining to transmit the at least one downlink shared channel transmission or to monitor for receipt of the one or more uplink transmissions based at least in part on a first priority associated with the one or more semi-persistent scheduling occasions and a second priority associated with the uplink grant.

Example 95: The method of any of examples 92 to 94, further comprising: determining to transmit the at least one downlink shared channel transmission or to monitor for receipt of the one or more uplink transmissions is further based at least in part on a configuration received from the base station.

Example 96: The method of any of examples 92 to 95, further comprising: determining to not monitor for receipt of the at least one downlink shared channel transmission or to transmit the one or more uplink transmissions based at least in part on a first priority associated with the one or more semi-persistent scheduling occasions and a second priority associated with the uplink grant being a same priority.

Example 97: The method of any of examples 92 to 96, wherein the one or more uplink transmissions comprise an uplink shared channel transmission, an uplink control channel transmission, a sounding reference signal transmission, or a combination thereof.

Example 98: The method of any of examples 92 5o 97, wherein the uplink grant comprises a configured grant.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    identifying a slot format for each slot of a first plurality of slots, wherein a pattern of slot formats for the first plurality of slots is repeated in subsequent pluralities of slots and wherein the slot format for at least one slot of the first plurality of slots specifies uplink resources and downlink resources separated in a frequency domain;
    receiving, from a base station, a plurality of semi-persistent scheduling configurations for receiving downlink transmissions from the base station, wherein each of the plurality of semi-persistent scheduling configurations is configured for one or more of the first plurality of slots and for corresponding slots of the subsequent pluralities of slots based at least in part on the slot format of each of the first plurality of slots; and
    communicating with the base station based at least in part on the plurality of semi-persistent scheduling configurations.

2. The method of claim 1, wherein receiving the plurality of semi-persistent scheduling configurations comprises:
    receiving a periodicity value such that each of the plurality of semi-persistent scheduling configurations is configured for the one or more of the first plurality of slots and for corresponding slots of the subsequent pluralities of slots based at least in part on the periodicity value.

3. The method of claim 2, wherein the periodicity value specifies a value n number of slots such that a particular semi-persistent scheduling configuration of the plurality of semi-persistent scheduling configurations is configured for the nth slot in the first plurality of slots and the nth slot in the subsequent pluralities of slots.

4. The method of claim 1, wherein receiving the plurality of semi-persistent scheduling configurations comprises:
    receiving a first semi-persistent scheduling configuration of the plurality of semi-persistent scheduling configurations that is configured for more than one slot of the first plurality of slots and for corresponding slots of the subsequent pluralities of slots, wherein the more than one slot each share a same slot format.

5. The method of claim 1, wherein communicating with the base station comprises:
    receiving the downlink transmissions from the base station in downlink resources of the first plurality of slots allocated based at least in part on the plurality of semi-persistent scheduling configurations.

6. The method of claim 5, wherein at least one downlink transmission is received in at least a portion of the downlink resources of the at least one slot.

7. The method of claim 1, wherein receiving the plurality of semi-persistent scheduling configurations comprises:
    receiving a radio resource control signal indicating the plurality of semi-persistent scheduling configurations.

8. The method of claim 1, wherein each of the plurality of semi-persistent scheduling configurations indicates a timing offset corresponding to a first subframe of a respective slot, duration of time-domain resources of the respective slot, frequency domain resources of the respective slot, or a combination thereof.

9. An apparatus for wireless communications at a user equipment (UE), comprising:
    a processor,
    memory coupled with the processor; and
    instructions stored in the memory and executable by the processor to cause the apparatus to:
        identify a slot format for each slot of a first plurality of slots, wherein a pattern of slot formats for the first plurality of slots is repeated in subsequent pluralities of slots and wherein the slot format for at least one slot of the first plurality of slots specifies uplink resources and downlink resources separated in a frequency domain;
        receive, from a base station, a plurality of semi-persistent scheduling configurations for receiving downlink transmissions from the base station, wherein each of the plurality of semi-persistent scheduling configurations is configured for one or more of the first plurality of slots and for corresponding slots of the subsequent pluralities of slots based at least in part on the slot format of each of the first plurality of slots; and
        communicate with the base station based at least in part on the plurality of semi-persistent scheduling configurations.

10. The apparatus of claim 9, wherein the instructions to receive the plurality of semi-persistent scheduling configurations are executable by the processor to cause the apparatus to:
    receive a periodicity value such that each of the plurality of semi-persistent scheduling configurations is configured for the one or more of the first plurality of slots and for corresponding slots of the subsequent pluralities of slots based at least in part on the periodicity value.

11. The apparatus of claim 10, wherein the periodicity value specifies a value n number of slots such that a particular semi-persistent scheduling configuration of the plurality of semi-persistent scheduling configurations is configured for the nth slot in the first plurality of slots and the nth slot in the subsequent pluralities of slots.

12. The apparatus of claim 9, wherein the instructions to receive the plurality of semi-persistent scheduling configurations are executable by the processor to cause the apparatus to:
    receive a first semi-persistent scheduling configuration of the plurality of semi-persistent scheduling configurations that is configured for more than one slot of the first plurality of slots and for corresponding slots of the subsequent pluralities of slots, wherein the more than one slot each share a same slot format.

13. The apparatus of claim 9, wherein the instructions to communicate with the base station are executable by the processor to cause the apparatus to:
receive the downlink transmissions from the base station in downlink resources of the first plurality of slots allocated based at least in part on the plurality of semi-persistent scheduling configurations.

14. The apparatus of claim 13, wherein at least one downlink transmission is received in at least a portion of the downlink resources of the at least one slot.

15. The apparatus of claim 9, wherein the instructions to receive the plurality of semi-persistent scheduling configurations are executable by the processor to cause the apparatus to:
receive a radio resource control signal indicating the plurality of semi-persistent scheduling configurations.

16. The apparatus of claim 9, wherein each of the plurality of semi-persistent scheduling configurations indicates a timing offset corresponding to a first subframe of a respective slot, duration of time-domain resources of the respective slot, frequency domain resources of the respective slot, or a combination thereof.

17. An apparatus for wireless communications at a user equipment (UE), comprising:
means for identifying a slot format for each slot of a first plurality of slots, wherein a pattern of slot formats for the first plurality of slots is repeated in subsequent pluralities of slots and wherein the slot format for at least one slot of the first plurality of slots specifies uplink resources and downlink resources separated in a frequency domain;
means for receiving, from a base station, a plurality of semi-persistent scheduling configurations for receiving downlink transmissions from the base station, wherein each of the plurality of semi-persistent scheduling configurations is configured for one or more of the first plurality of slots and for corresponding slots of the subsequent pluralities of slots based at least in part on the slot format of each of the first plurality of slots; and
means for communicating with the base station based at least in part on the plurality of semi-persistent scheduling configurations.

18. The apparatus of claim 17, wherein the means for receiving the plurality of semi-persistent scheduling configurations comprises:
means for receiving a periodicity value such that each of the plurality of semi-persistent scheduling configurations is configured for the one or more of the first plurality of slots and for corresponding slots of the subsequent pluralities of slots based at least in part on the periodicity value.

19. The apparatus of claim 18, wherein the periodicity value specifies a value n number of slots such that a particular semi-persistent scheduling configuration of the plurality of semi-persistent scheduling configurations is configured for the nth slot in the first plurality of slots and the nth slot in the subsequent pluralities of slots.

20. The apparatus of claim 17, wherein the means for receiving the plurality of semi-persistent scheduling configurations comprises:
means for receiving a first semi-persistent scheduling configuration of the plurality of semi-persistent scheduling configurations that is configured for more than one slot of the first plurality of slots and for corresponding slots of the subsequent pluralities of slots, wherein the more than one slot each share a same slot format.

21. The apparatus of claim 17, wherein the means for communicating with the base station comprises:
means for receiving the downlink transmissions from the base station in downlink resources of the first plurality of slots allocated based at least in part on the plurality of semi-persistent scheduling configurations.

22. The apparatus of claim 21, wherein at least one downlink transmission is received in at least a portion of the downlink resources of the at least one slot.

23. The apparatus of claim 17, wherein each of the plurality of semi-persistent scheduling configurations indicates a timing offset corresponding to a first subframe of a respective slot, duration of time-domain resources of the respective slot, frequency domain resources of the respective slot, or a combination thereof.

24. A method of wireless communications at a base station, comprising:
identifying a slot format for each slot of a first plurality of slots, wherein a pattern of slot formats for the first plurality of slots is repeated in subsequent pluralities of slots and wherein the slot format for at least one slot of the first plurality of slots specifies uplink resources and downlink resources separated in a frequency domain;
transmitting, to a user equipment (UE), a plurality of semi-persistent scheduling configurations for receiving, by the UE, downlink transmissions from the base station, wherein each of the plurality of semi-persistent scheduling configurations is configured for one or more of the first plurality of slots and for corresponding slots of the subsequent pluralities of slots based at least in part on the slot format of each of the first plurality of slot; and
communicating with the UE based at least in part on the plurality of semi-persistent scheduling configurations.

25. The method of claim 24, wherein transmitting the plurality of semi-persistent scheduling configurations comprises:
transmitting a periodicity value such that each of the plurality of semi-persistent scheduling configurations is configured for the one or more of the first plurality of slots and for corresponding slots of the subsequent pluralities of slots based at least in part on the periodicity value.

26. The method of claim 25, wherein the periodicity value specifies a value n number of slots such that a particular semi-persistent scheduling configuration of the plurality of semi-persistent scheduling configurations is configured for the nth slot in the first plurality of slots and the nth slot in the subsequent pluralities of slots.

27. The method of claim 24, further comprising:
transmitting the plurality of semi-persistent scheduling configurations comprises a first semi-persistent scheduling configuration of the plurality of semi-persistent scheduling configurations that is configured for more than one slot of the first plurality of slots and for corresponding slots of the subsequent pluralities of slots, wherein the more than one slot each share a same slot format.

28. The method of claim 24, wherein communicating with the UE comprises:
transmitting the downlink transmissions to the UE in downlink resources of the first plurality of slots allocated based at least in part on the plurality of semi-persistent scheduling configurations.

29. The method of claim 28, wherein at least one downlink transmission is transmitted in at least a portion of the downlink resources of the at least one slot.

30. The method of claim 24, wherein each of the plurality of semi-persistent scheduling configurations indicates a timing offset corresponding to a first subframe of a respective slot, duration of time-domain resources of the respective slot, frequency domain resources of the respective slot, or a combination thereof.

* * * * *